(12) United States Patent
Yoshizawa et al.

(10) Patent No.: US 10,042,811 B2
(45) Date of Patent: Aug. 7, 2018

(54) EXPRESSION PROCESSING DEVICE, COMPUTE SERVER AND RECORDING MEDIUM HAVING EXPRESSION PROCESSING PROGRAM RECORDED THEREON

(71) Applicant: CASIO COMPUTER CO., LTD., Shibuya-ku, Tokyo (JP)

(72) Inventors: Hiroaki Yoshizawa, Ome (JP); Manato Ono, Wako (JP); Saburo Kamitani, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 10 days.

(21) Appl. No.: 14/855,921

(22) Filed: Sep. 16, 2015

(65) Prior Publication Data

US 2016/0085716 A1    Mar. 24, 2016

(30) Foreign Application Priority Data

Sep. 19, 2014   (JP) .................................. 2014-191879
Nov. 26, 2014   (JP) .................................. 2014-239295

(51) Int. Cl.
  *G06F 17/16*    (2006.01)
  *G06F 15/02*    (2006.01)

(52) U.S. Cl.
  CPC .......... *G06F 15/0225* (2013.01); *G06F 17/16* (2013.01)

(58) Field of Classification Search
  CPC ...................................................... G06F 17/16
  See application file for complete search history.

(56) References Cited

U.S. PATENT DOCUMENTS

| | | | |
|---|---|---|---|
| 4,001,569 | A | 1/1977 | Dickinson et al. |
| 4,764,120 | A | 8/1988 | Griffin et al. |
| 4,963,097 | A | 10/1990 | Anju |
| 5,189,633 | A | 2/1993 | Bonadio |
| 6,302,698 | B1 | 10/2001 | Ziv-El |
| 6,750,864 | B1 | 6/2004 | Anwar |
| 8,789,197 | B1 | 7/2014 | Wolfram et al. |
| 2002/0115050 | A1 | 8/2002 | Roschelle et al. |
| 2004/0072136 | A1 | 4/2004 | Roschelle et al. |
| 2005/0101314 | A1 | 5/2005 | Levi |

(Continued)

FOREIGN PATENT DOCUMENTS

| | | |
|---|---|---|
| JP | 10171786 A | 6/1998 |
| JP | 2004206405 A | 7/2004 |

(Continued)

OTHER PUBLICATIONS

Japanese Office Action (and English translation thereof) dated Jul. 5, 2016, issued in counterpart Japanese Application No. 2014-239295.

(Continued)

*Primary Examiner* — Michael D. Yaary
(74) *Attorney, Agent, or Firm* — Holtz, Holtz & Volek PC

(57) ABSTRACT

An expression processing device of the present invention includes an input unit, a display and a processor. The processor is configured to perform following processes: inputting an expression in response to a user's operation on the input unit; detecting a plurality of variables included in the expression input by the input unit, among the plurality of variables which are usable in expressions; and outputting the input expression and variable values associated with the detected variables.

9 Claims, 22 Drawing Sheets

(56) References Cited

U.S. PATENT DOCUMENTS

| | | |
|---|---|---|
| 2006/0183100 A1 | 8/2006 | Voehl et al. |
| 2007/0050432 A1 | 3/2007 | Yoshizawa |
| 2008/0003559 A1 | 1/2008 | Toyama et al. |
| 2008/0104691 A1 | 5/2008 | Takeda et al. |
| 2009/0066689 A1 | 3/2009 | Yamaguchi et al. |
| 2009/0240751 A1 | 9/2009 | Renshaw et al. |
| 2009/0254597 A1 | 10/2009 | Karoji |
| 2010/0227304 A1 | 9/2010 | Horikawa et al. |
| 2011/0254862 A1 | 10/2011 | Okano |
| 2012/0251997 A1 | 10/2012 | Kojo |
| 2013/0026239 A1 | 1/2013 | Sakahashi et al. |
| 2013/0050064 A1 | 2/2013 | Okano |
| 2013/0082100 A1 | 4/2013 | Stavrou et al. |
| 2013/0209982 A1 | 8/2013 | Rooks et al. |
| 2013/0309648 A1 | 11/2013 | Park et al. |
| 2014/0009496 A1 | 1/2014 | Chapman et al. |
| 2014/0342341 A1 | 11/2014 | Rea |
| 2014/0356838 A1 | 12/2014 | Freimuth et al. |
| 2016/0085717 A1 | 3/2016 | Ono et al. |
| 2016/0085845 A1 | 3/2016 | Yoshizawa |
| 2016/0086362 A1 | 3/2016 | Suzuki |
| 2016/0086512 A1 | 3/2016 | Yoshizawa |
| 2016/0086513 A1 | 3/2016 | Uejima et al. |

FOREIGN PATENT DOCUMENTS

| | | | |
|---|---|---|---|
| JP | 2006099256 A | | 4/2006 |
| JP | 2006125871 A | | 5/2006 |
| JP | 2006309619 A | | 11/2006 |
| JP | 2007304656 A | | 11/2007 |
| JP | 2009049948 A | | 3/2009 |
| JP | 2010129075 A | | 6/2010 |
| JP | 2011076540 A | | 4/2011 |
| JP | 2011081301 A | | 4/2011 |
| JP | 2011097287 A | | 5/2011 |
| JP | 4720607 B2 | | 7/2011 |
| JP | 2011204003 A | | 10/2011 |
| JP | 2012248013 A | | 12/2012 |
| JP | 2013025501 A | | 2/2013 |
| JP | 2013050746 A | | 3/2013 |
| JP | 2013073325 A | | 4/2013 |
| JP | 2013134740 A | | 7/2013 |
| JP | 2014023280 A | | 2/2014 |
| WO | 2009107245 A1 | | 9/2009 |
| WO | 2012111559 A1 | | 8/2012 |

OTHER PUBLICATIONS

U.S. Appl. No. 14/855,084; First Named Inventor: Hiroaki Yoshizawa; Title: "Server Apparatus, Data Aggregation Method, and Communication Device"; filed Sep. 15, 2015.

U.S. Appl. No. 14/855,122; First Named Inventor: Miki Suzuki; Title: "Electronic Device, Data Output Method in Electronic Device, and Server Device"; filed Sep. 15, 2015.

U.S. Appl. No. 14/855,159; First Named Inventor: Hiroaki Yoshizawa; Title: "Server Apparatus, Method of Aggregating Calculation Target Data, and Storage Medium Storing Calculation Data Aggregation Program"; filed Sep. 15, 2015.

U.S. Appl. No. 14/856,031; First Named Inventor: Hiroshi Uejima; Title: "Server Apparatus, Data Integration Method and Electronic Device"; filed Sep. 16, 2015.

U.S. Appl. No. 14/856,478; First Named Inventor: Manato Ono; Title: "Calculator, Recording Medium and Compute Server"; filed Sep. 16, 2015.

Togawa, et al., "Derive, Low-Price, Functionally-Rich Formula-Processing System Operating on MS-DOS", Nikkei Byte, Japan, Nikkei BP, Apr. 1, 1989, No. 57, pp. 265-269.

Watanabe, et al., "An Implementation of Graph Web Service and Its Application on Mathematical Education", Technical Research Report of the Institute of Electronics, Information and Communication Engineers, Japan, Jul. 18, 2005, vol. 105, No. 207, pp. 13-17.

Extended European Search Report (EESR) dated Dec. 22, 2017 issued in counterpart European Application No. 15185876.8.

Yang, et al., "iMathema", Innovative Computing and Cloud Computing, ACM, 2 Penn Plaza, Suite 701, New York, NY 10121-0701 USA, Dec. 1, 2013, pp. 16-17.

Japanese Office Action dated May 30, 2017 issued in Japanese Application No. 2014-236135.

Japanese Office Action dated Jul. 4, 2017 issued in Japanese Application No. 2014-191879.

Japanese Office Action dated May 30, 2017 issued in Japanese Application No. 2014-236083.

Japanese Office Action drafted Jun. 6, 2017 in Japanese Application No. 2014-239297.

Japanese Office Action dated Oct. 10, 2017 issued in Japanese Application No. 2016-179499.

Ito, et al., "Emulation of Graph Calculator with Image Input—Mounting on Cellular Phone", FIT2007 (6th Forum of Information Technology), General lecture collected papers.

Japanese Office Action dated Nov. 28, 2017 issued in Japanese Application No. 2014-236083.

(CONT.)

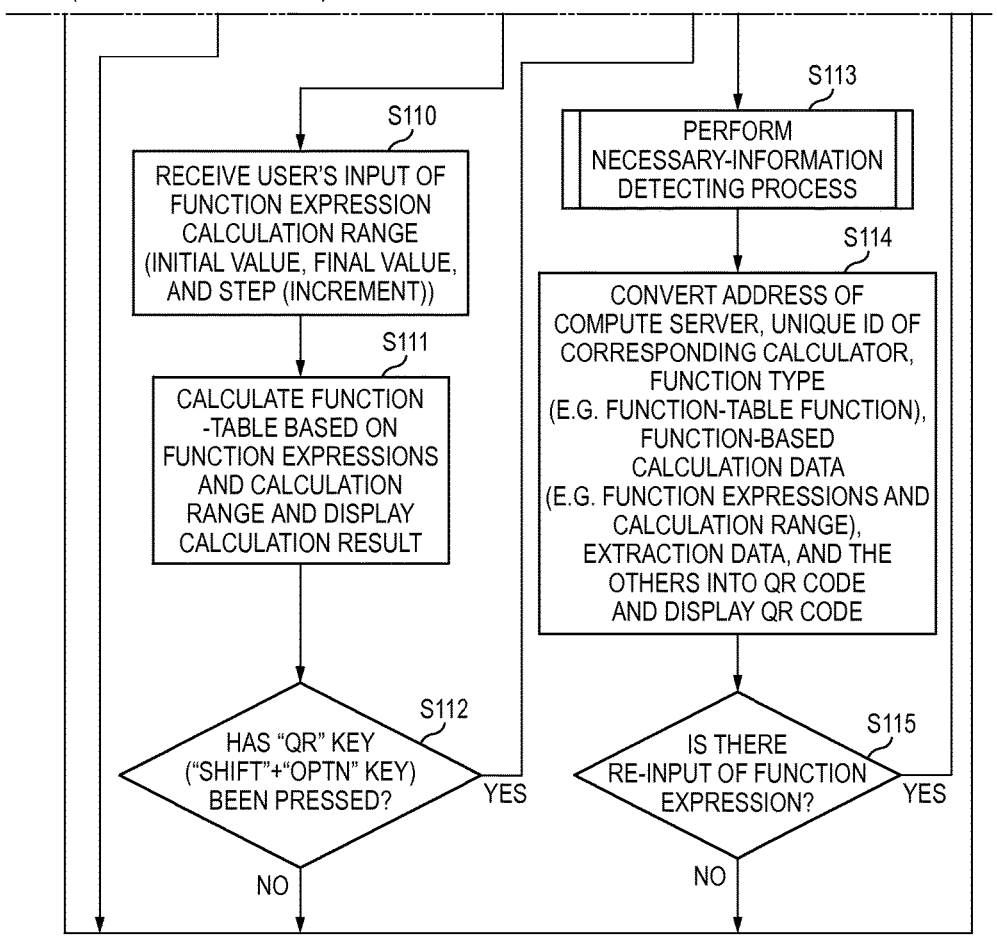

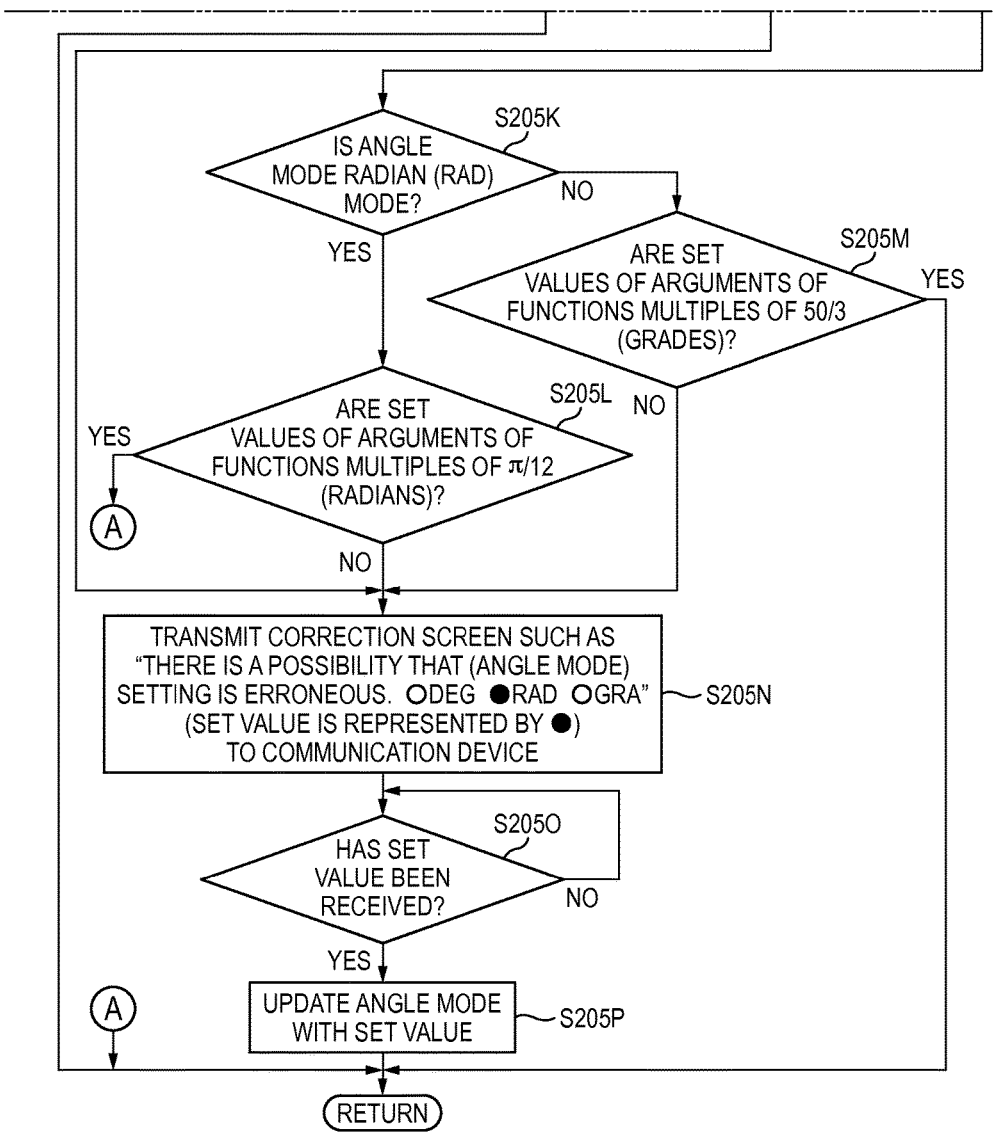

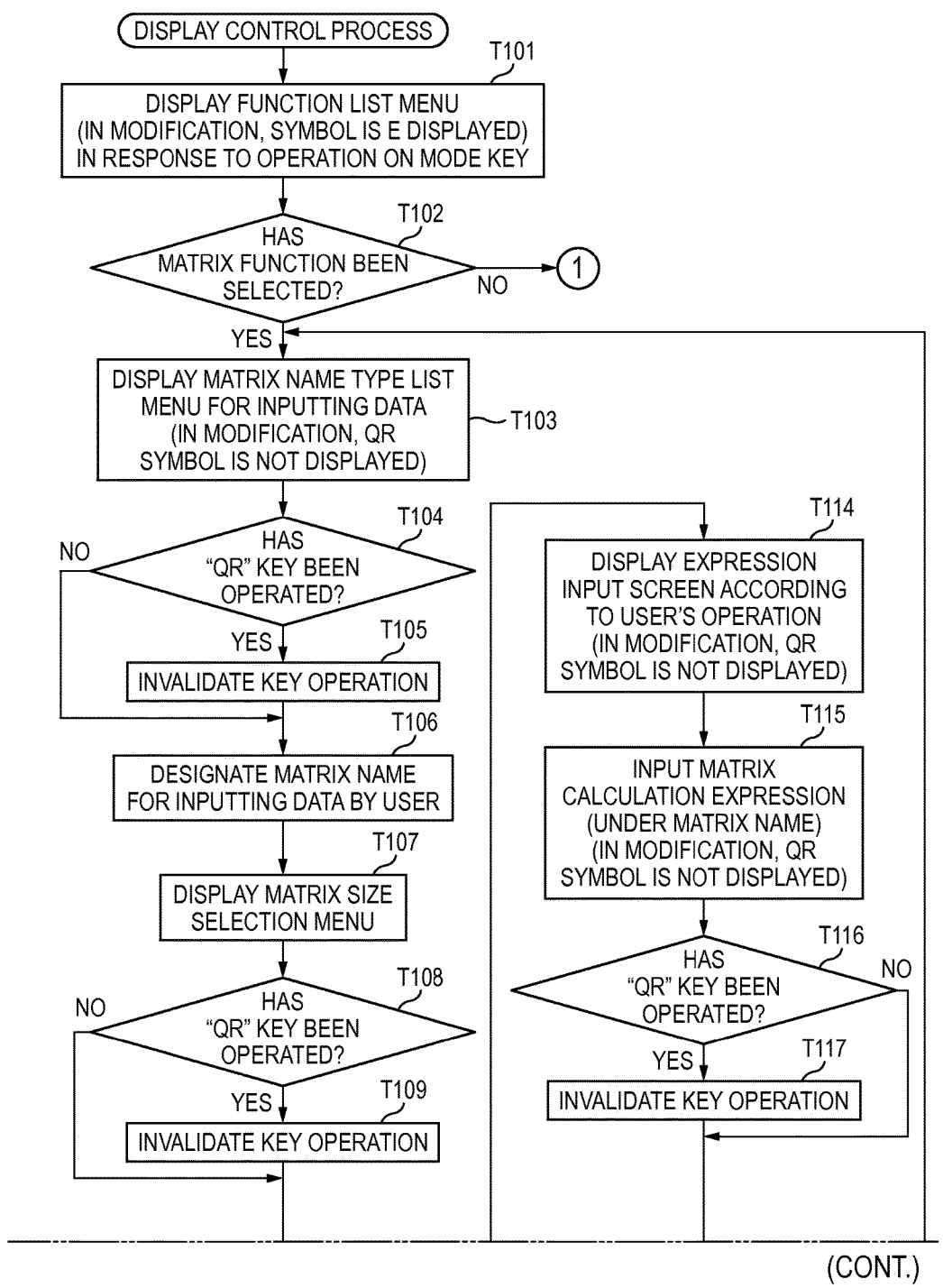

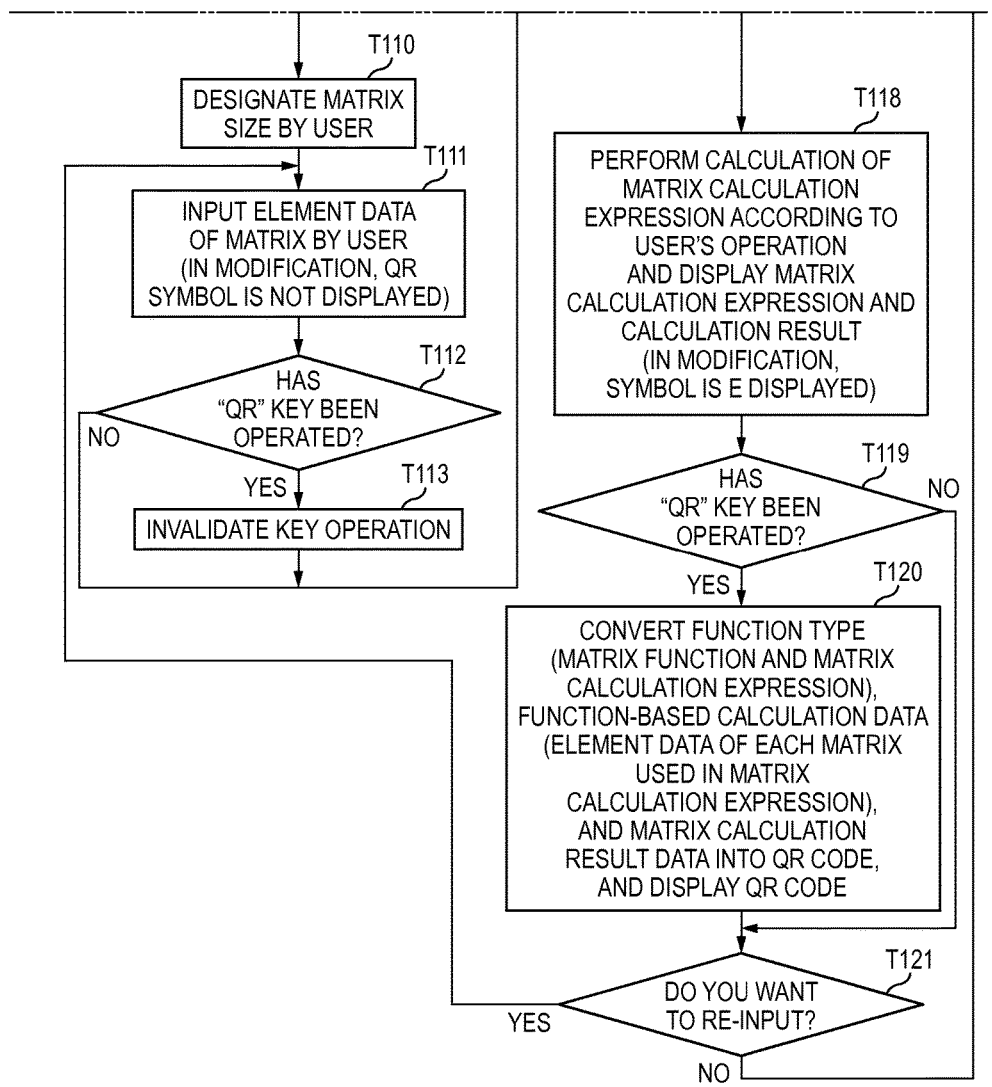

EXPRESSION PROCESSING DEVICE, COMPUTE SERVER AND RECORDING MEDIUM HAVING EXPRESSION PROCESSING PROGRAM RECORDED THEREON

CROSS-REFERENCE TO RELATED APPLICATIONS

The present application claims the priority of Japanese Patent Application Nos. 2014-191879 filed on Sep. 19, 2014, and 2014-239295 filed on Nov. 26, 2014, the contents of which being here incorporated for reference.

BACKGROUND OF THE INVENTION

Field of the Invention

The present invention relates to an expression processing device, an expression processing method, a compute server, and a recording medium having an expression processing program recorded thereon.

Description of the Related Art

JP-A-2011-76540 proposes a technology for converting a text input by a text input display device into a two-dimensional code such as a QR code (a trademark) and displaying the two-dimensional code such that it is possible to photograph the two-dimensional code with a camera of another device and convert the two-dimensional code into the text and use the text in the corresponding device.

Meanwhile, in the related art, expression processing devices for learning the calculation procedures of various function expressions, called scientific calculators, are widely used.

Also, in recent, compute servers which allow access from communication devices such as smart phones and provide highly functional computation services on the Internet have been provided.

Even with respect to an expression processing device, a technology for converting an input expression into a two-dimensional code, and photographing the two-dimensional code with a camera of a communication device such as a smart phone like, in JP-A-2011-76540, and calculating the expression in the corresponding communication device, or accessing a compute server to calculate the expression from the corresponding communication device can be considered.

However, if the expression processing device just converts an input expression into a two-dimensional code like in JP-A-2011-76540, although the corresponding communication device or compute server can use the expression, the expression may be insufficient as information for appropriately calculating the corresponding expression. That is, some expressions need related data essential for calculating those expressions, such as settings and variables essential for calculating those expressions.

SUMMARY OF THE INVENTION

The present invention was made in view of those problems, and an object of the present invention is to provide an expression processing device which can output an input expression such that it is possible to calculate the expression in a communication device or a compute server, a compute server which calculates an expression output from the corresponding expression processing device, and so on.

An expression processing device of the present invention includes an input unit, a display and a processor. The processor is configured to perform following processes: inputting an expression in response to a user's operation on the input unit; detecting a plurality of variables included in the expression input by the input unit, among the plurality of variables which are usable in expressions; and outputting the input expression and variable values associated with the detected variables.

Figure 5:
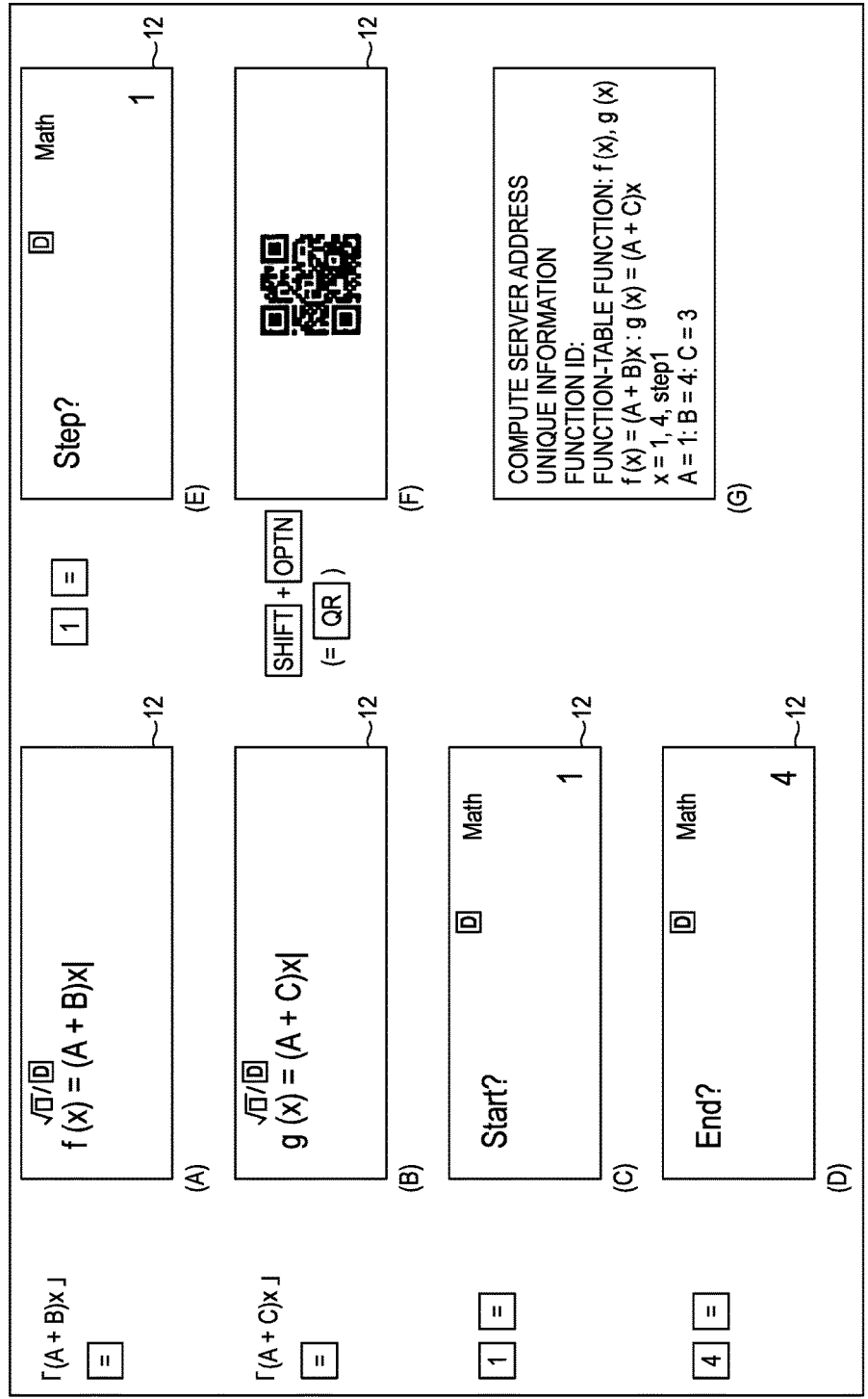

Part (A) to Part (F) of FIG. 5 each are a view illustrating a user's operation on the scientific calculator and a display output according to the corresponding operation, as an example, and Part (G) of FIG. 5 is a view illustrating data on two-dimensional code content.

Figure 4:
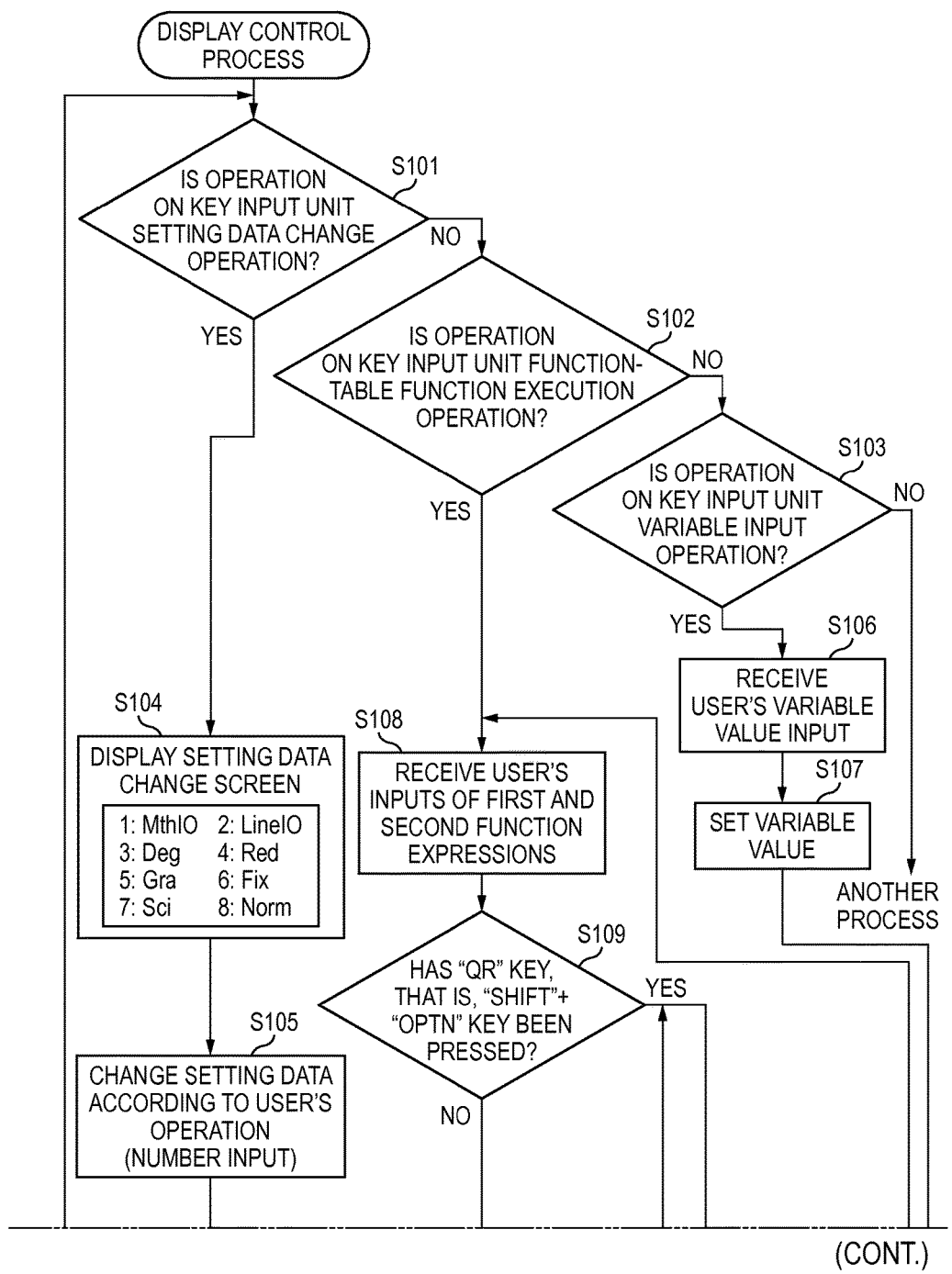
FIG. 4 is a view illustrating a flow chart of a display control process of the scientific calculator.
Figure 6A:
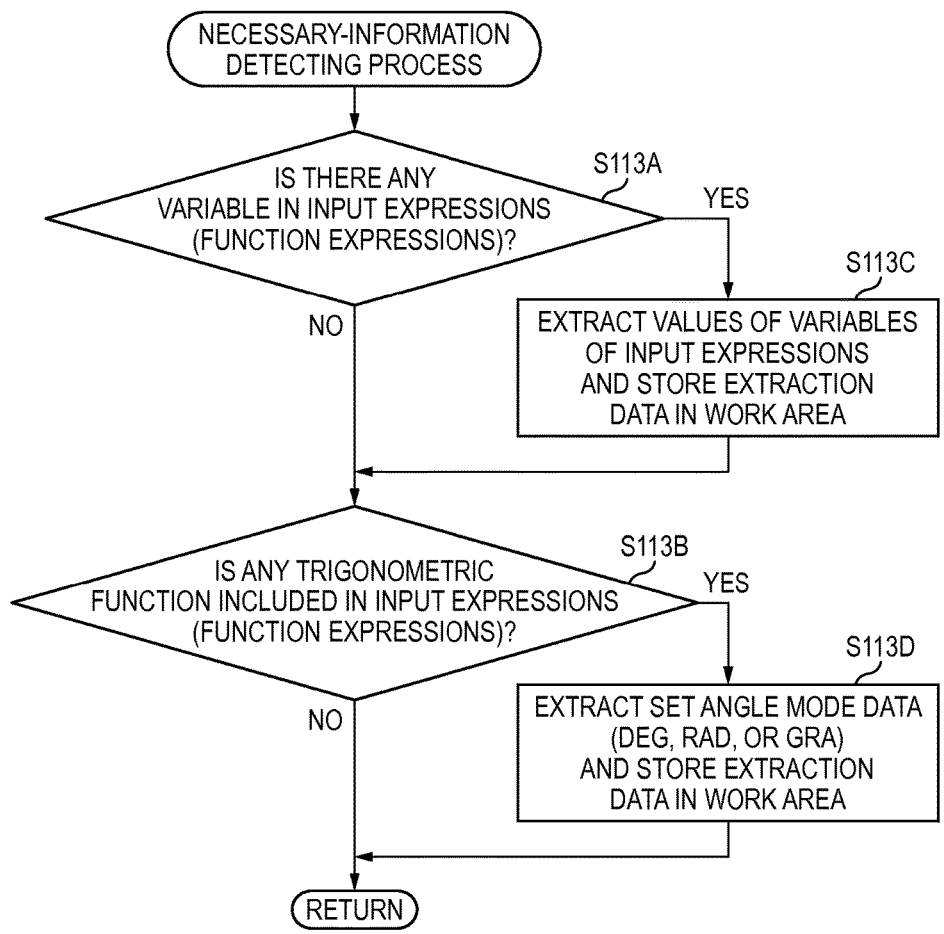

FIG. 6A is a view illustrating a flow chart of a necessary-information detecting process of FIG. 4.

Figure 6B:
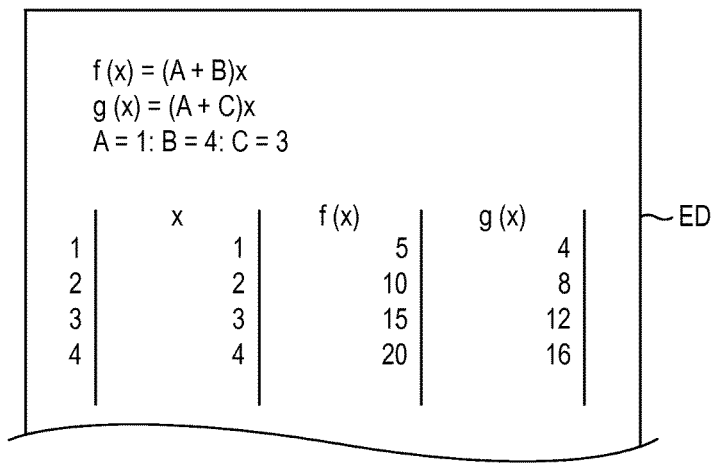

FIG. 6B is a view illustrating a calculation result display of a communication device based on two-dimensional code content of Part (G) of FIG. 5.

Figure 6C:
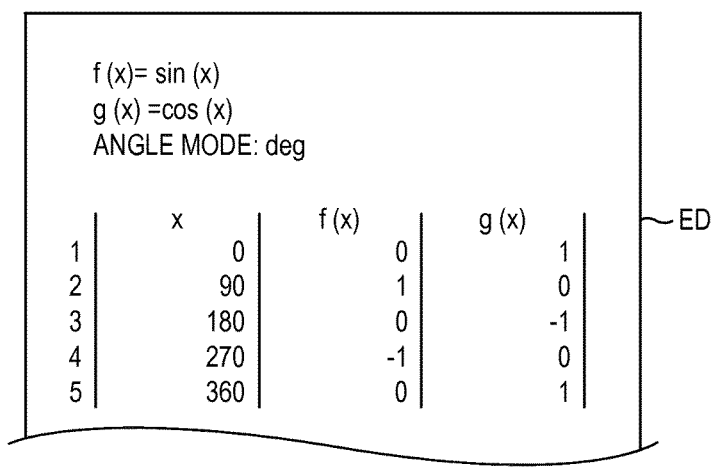
Figure 7:
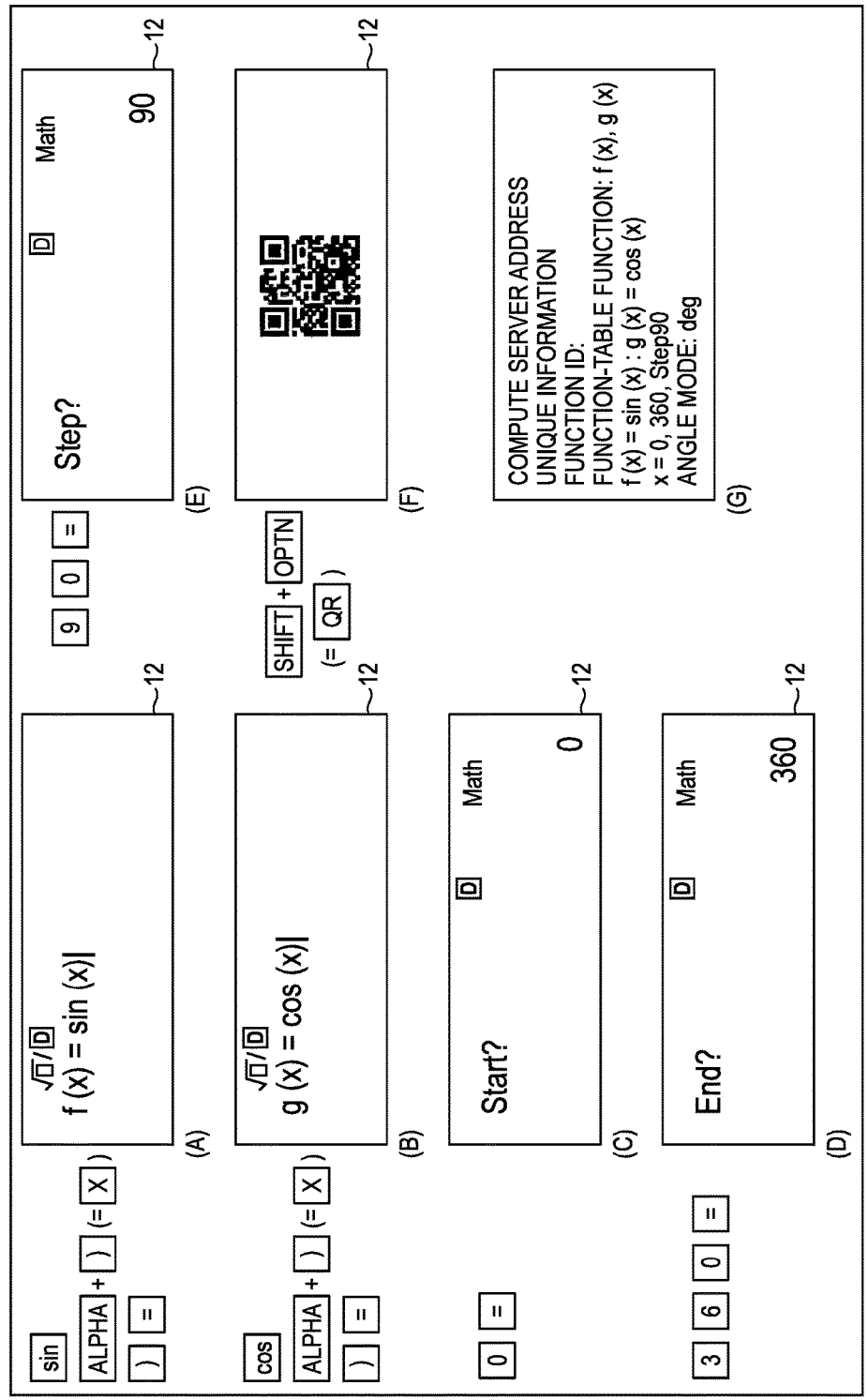

FIG. 6C is a view illustrating a calculation result display of the communication device based on two-dimensional code content of Part (G) of FIG. 7.

Part (A) to Part (F) of FIG. 7 each are a view illustrating a user's operation on the scientific calculator and a display output according to the corresponding operation as an example, and Part (G) of FIG. 7 is a view illustrating data on two-dimensional code content.

Figure 8A:
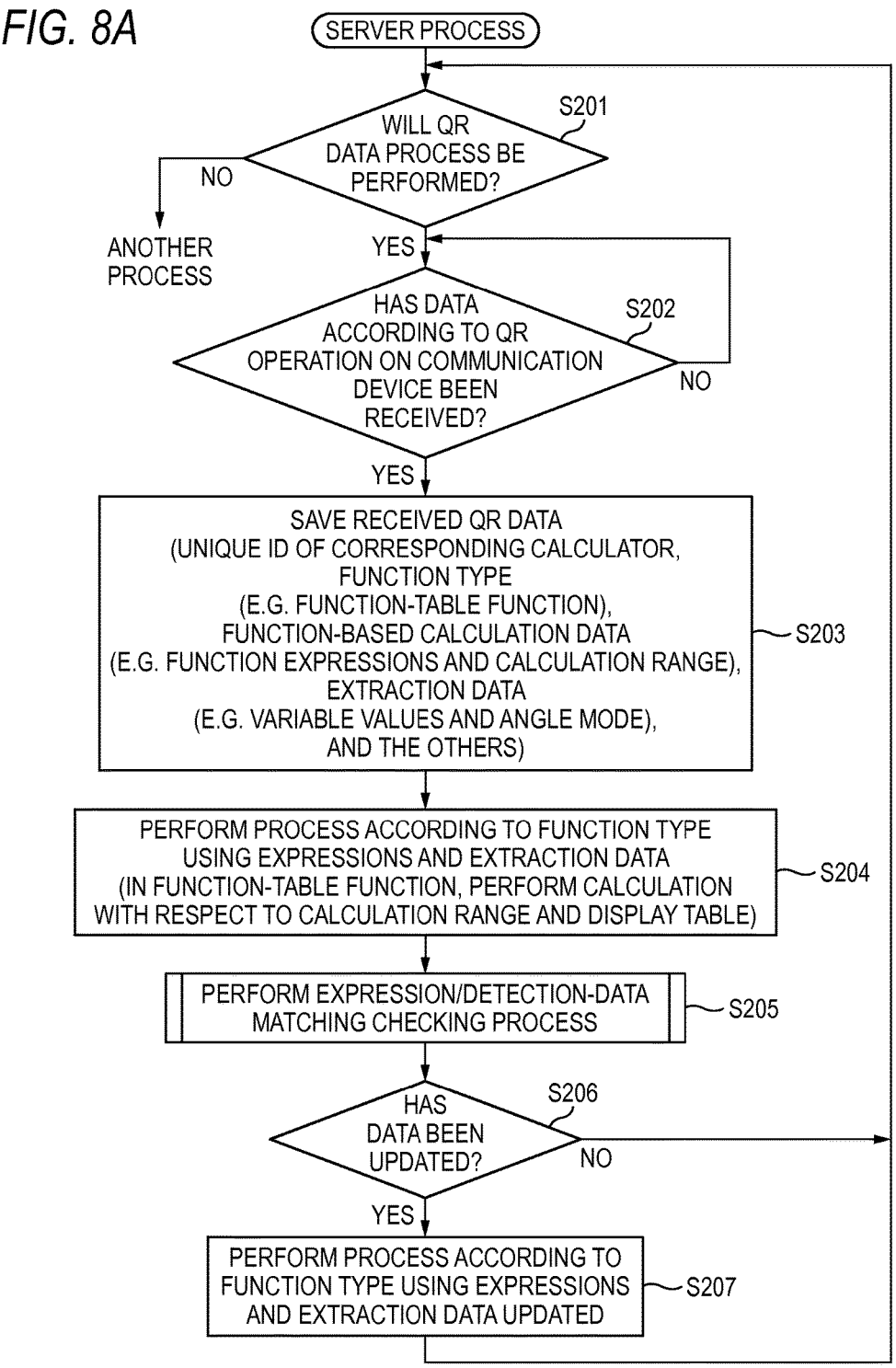

FIG. 8A is a view illustrating a flow chart of a server process of the compute server.

Figure 8B:
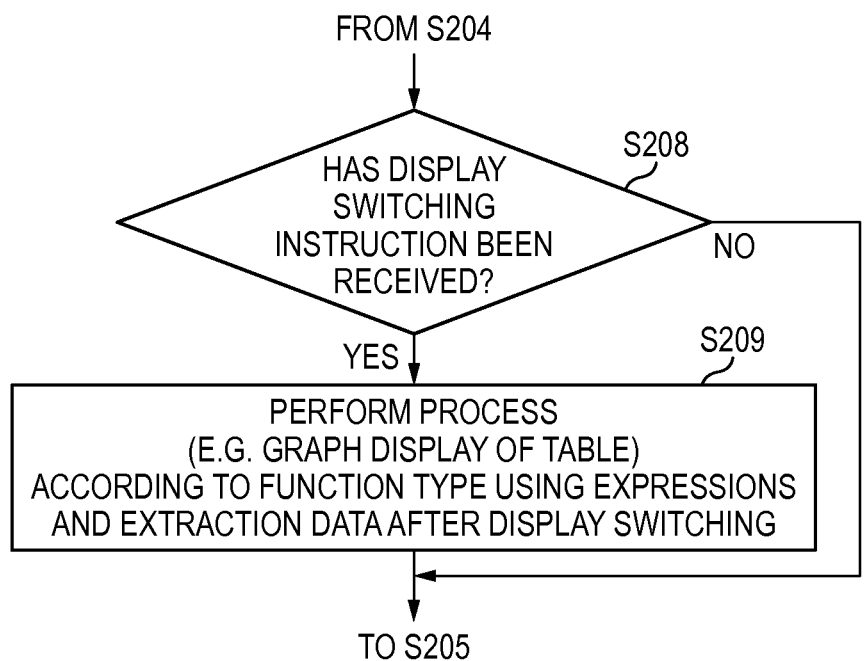

FIG. 8B is a view illustrating a flow chart of a server process of a compute server according to a second embodiment of the present invention.

Figure 9:
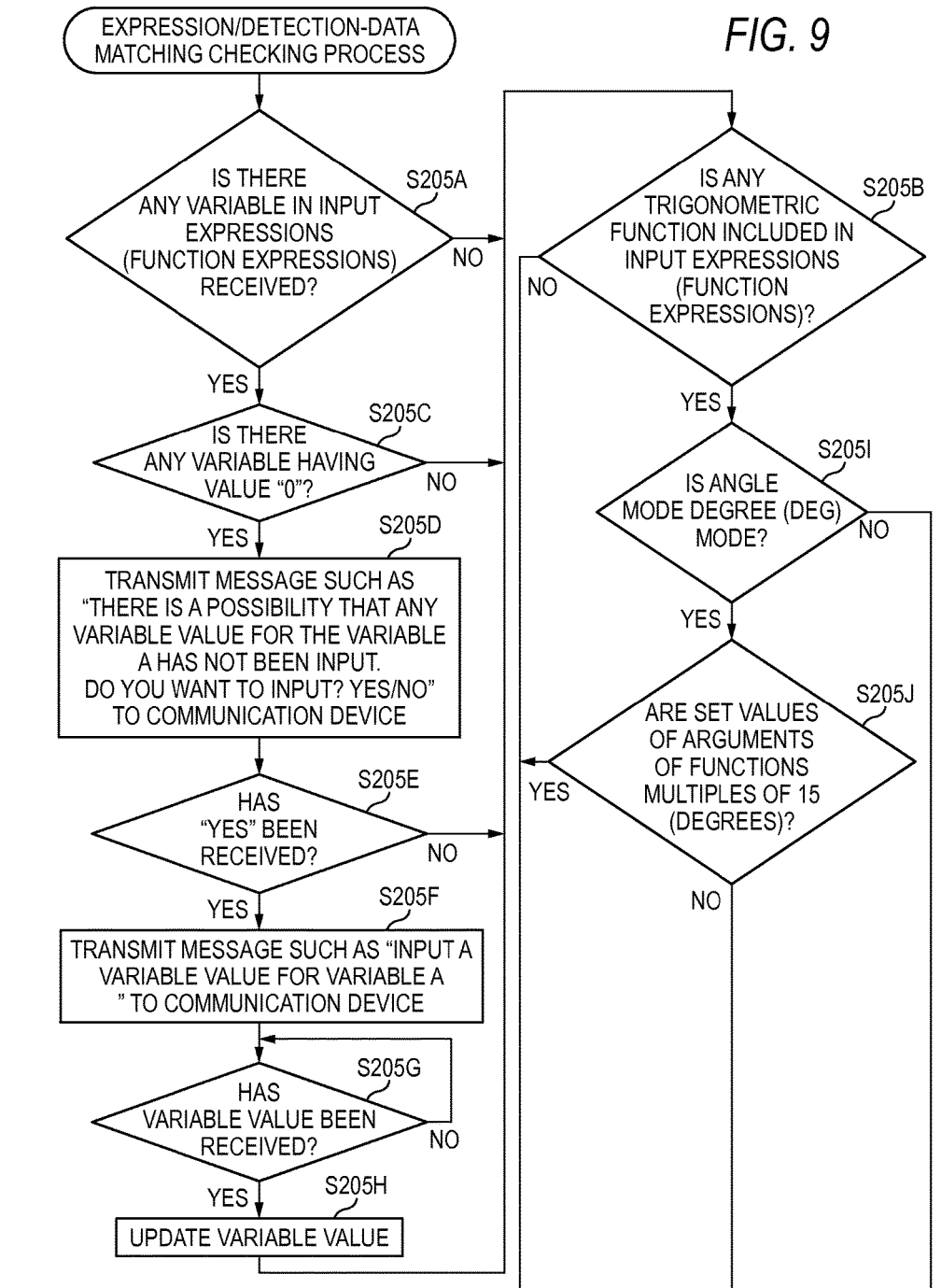

FIG. 9 is a view illustrating a flow chart of an expression/detection-data matching checking process of FIG. 8A.

Figure 10:
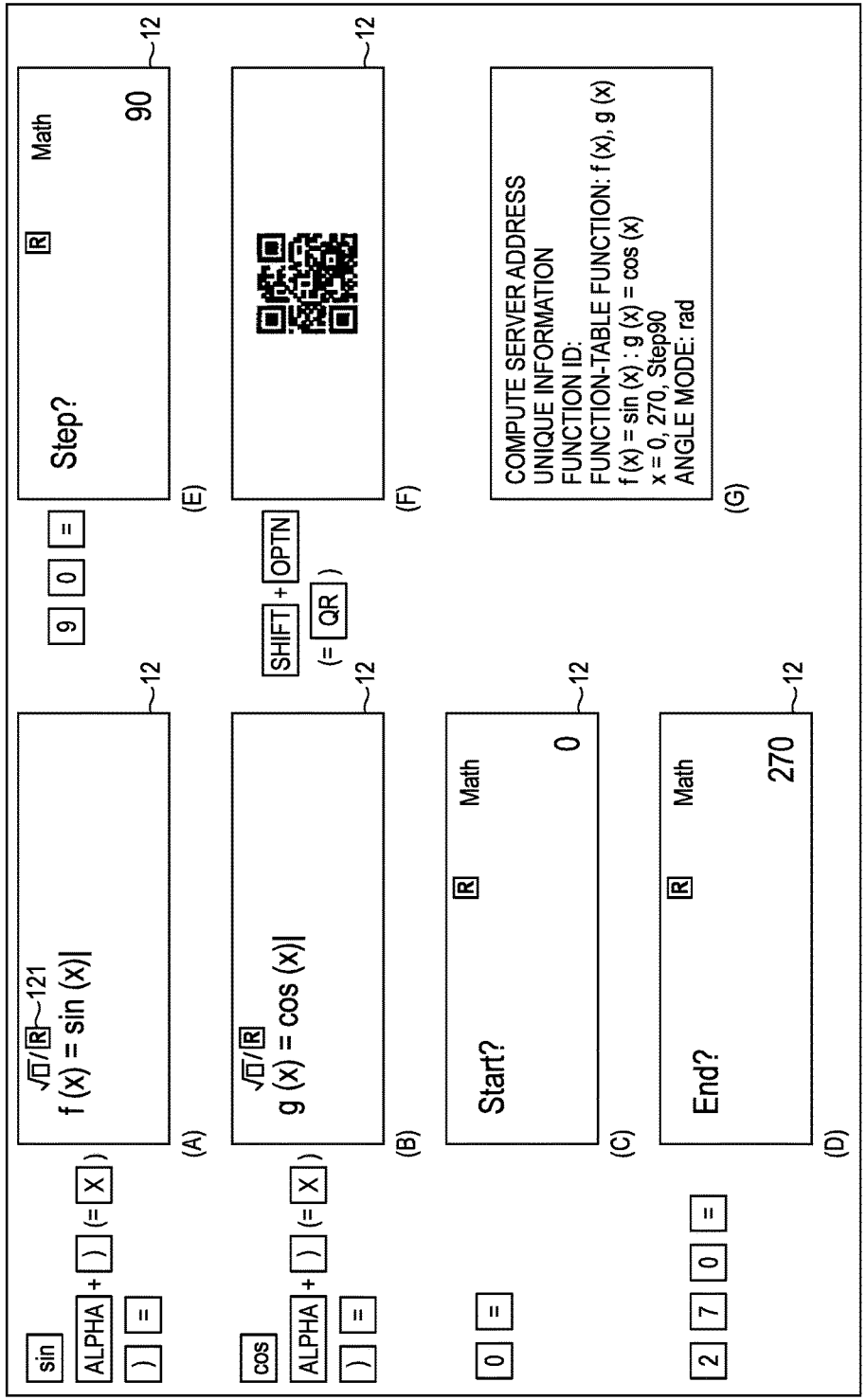

Part (A) to Part (F) of FIG. 10 each are a user's operation on the scientific calculator and a display output according to the corresponding operation as an example, and Part (G) of FIG. 10 is a view illustrating two-dimensional code content.

Figure 11:
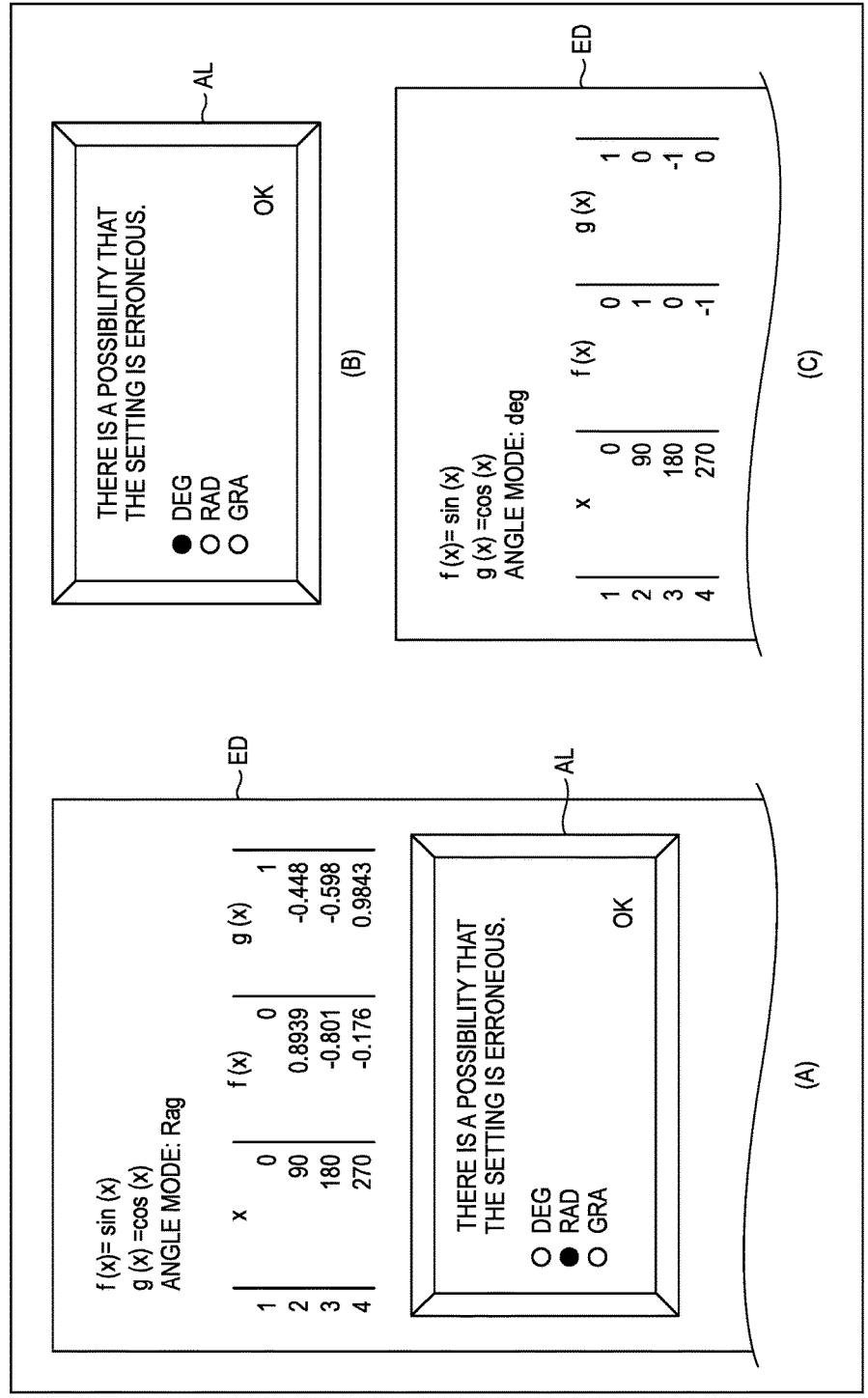

Part (A) of FIG. 11 is a view illustrating a calculation result display of the communication device based on the two-dimensional code content of Part (G) of FIG. 10, and Part (B) of FIG. 11 is a view for explaining a set-value correction input in the communication device, and Part (C) of FIG. 11 is a view illustrating a calculation result display of the communication device based on a corrected set value.

Figure 12:
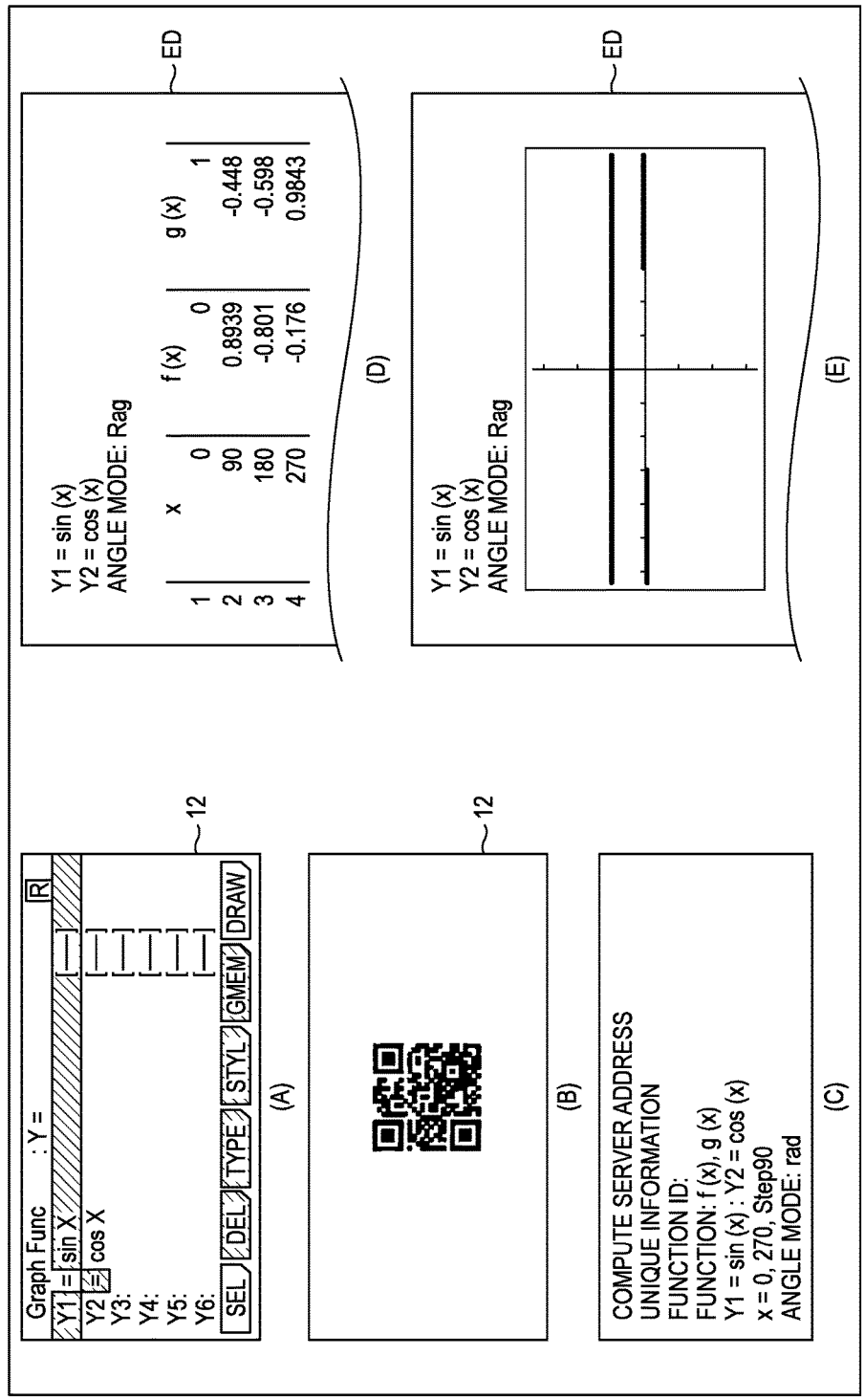

Part (A) and Part (B) of FIG. 12 each are a view illustrating a display example of a scientific calculator according to a second embodiment of the expression processing device of the present invention, and Part (C) of FIG. 12 is a view illustrating two-dimensional code content, and Part (D) of FIG. 12 is a view illustrating a calculation result table display of the communication device based on the two-dimensional code content of Part (C) of FIG. 12, and Part (E) of FIG. 12 is a view illustrating a calculation result graph display of the communication device after display switching.

Figure 13:
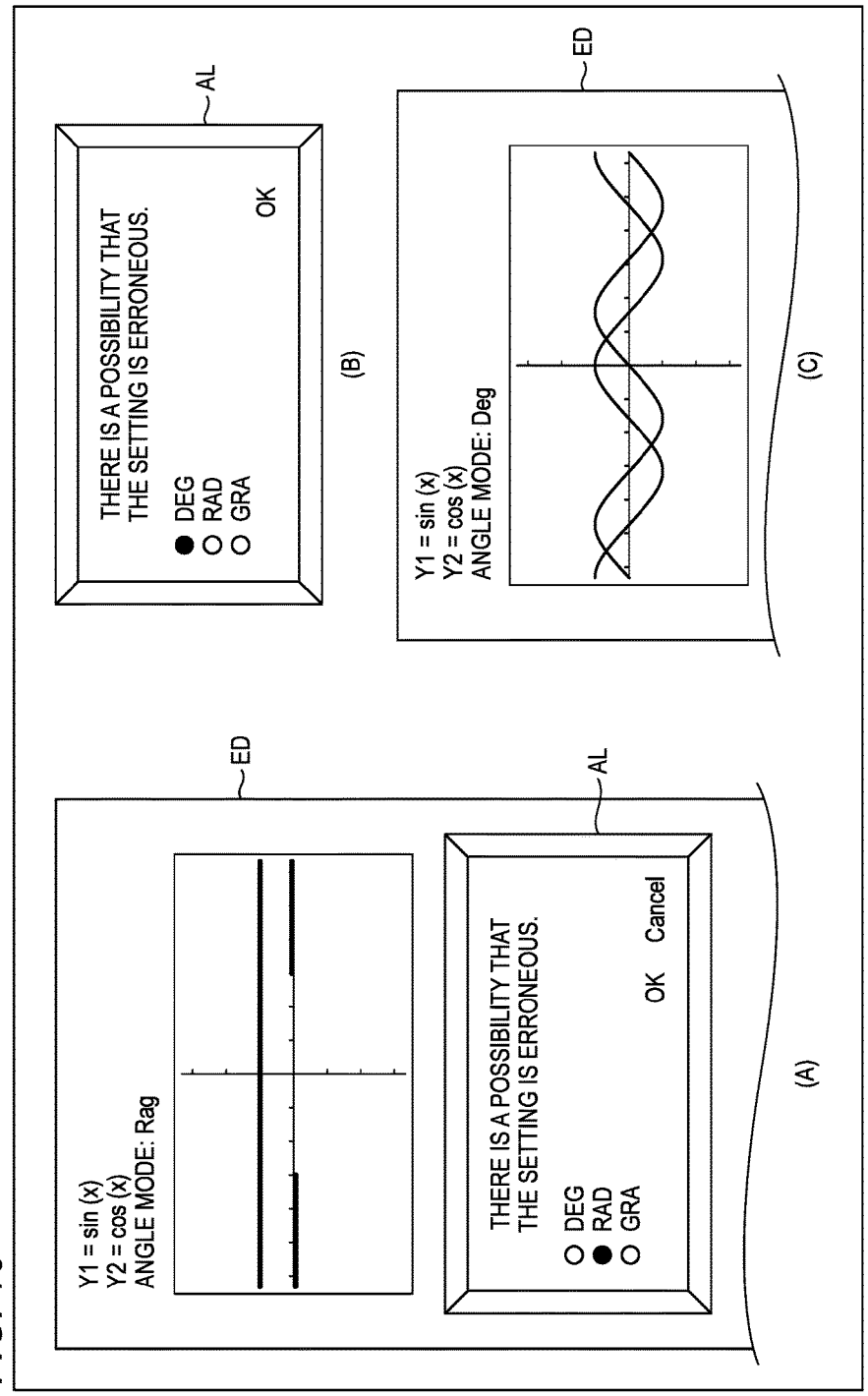

Part (A) of FIG. 13 is a view illustrating an alert display of a graph display, and Part (B) of FIG. 13 is a view for explaining a set-value correction input in the communication device, and Part (C) of FIG. 13 is a view illustrating a calculation result graph display of the communication device based on a corrected set value.

FIG. 14 is a flow chart illustrating a display control process (a modification) of the scientific calculator.

Figure 15:
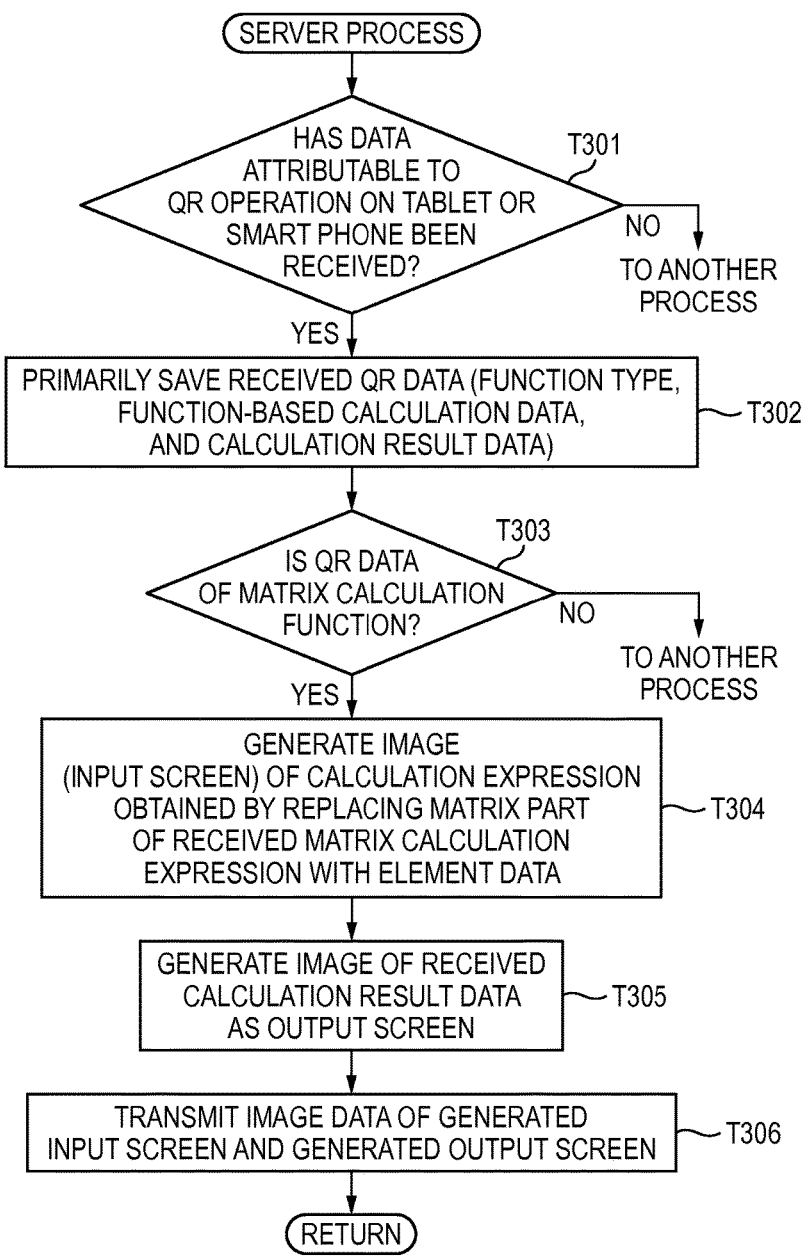

FIG. 15 is a flow chart illustrating a server process (a matrix mode) of the compute server.

Figure 16:
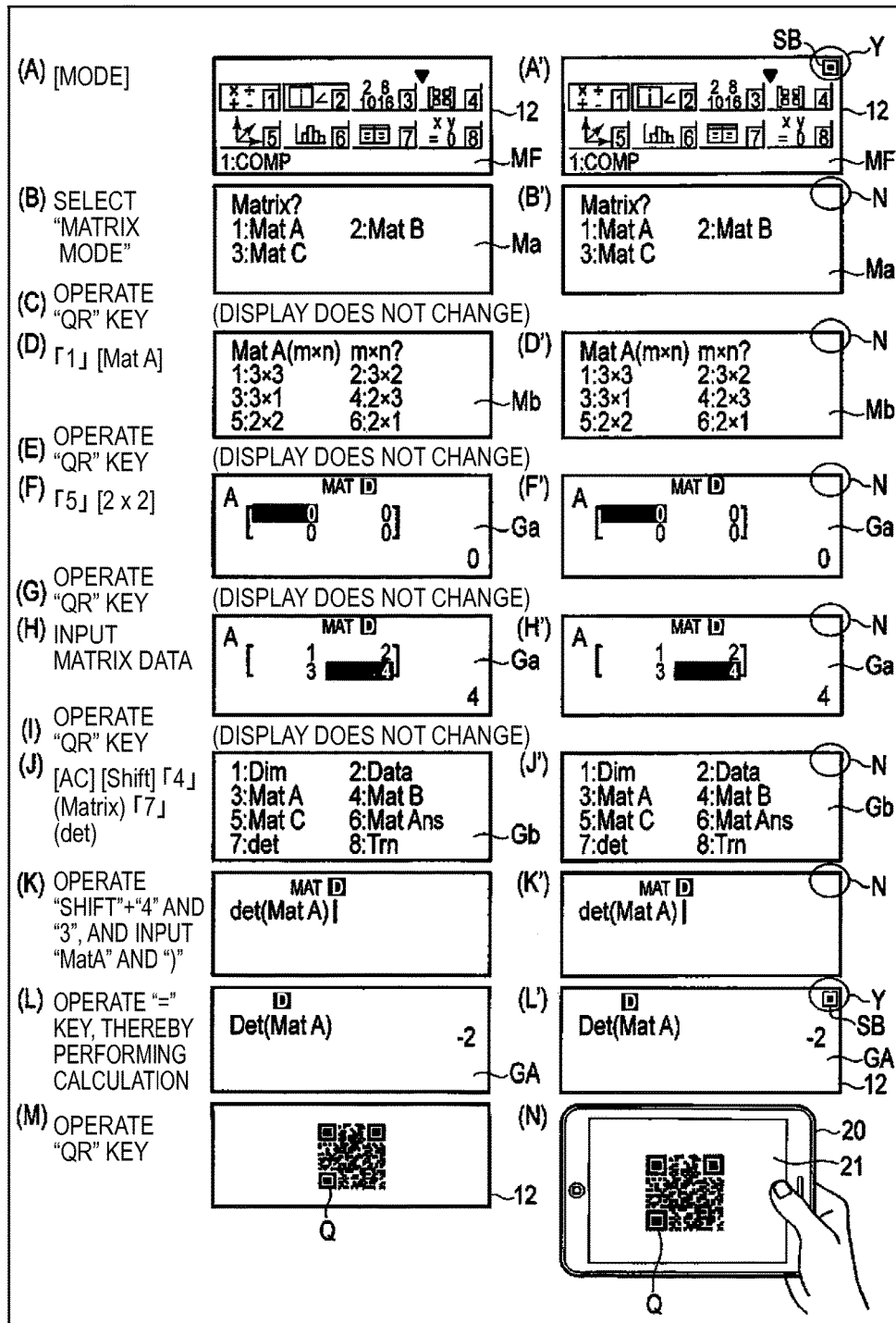

FIG. 16 is a view illustrating a display operation according to a user's operation in the matrix mode according to the display control process of the scientific calculator.

Figure 17:
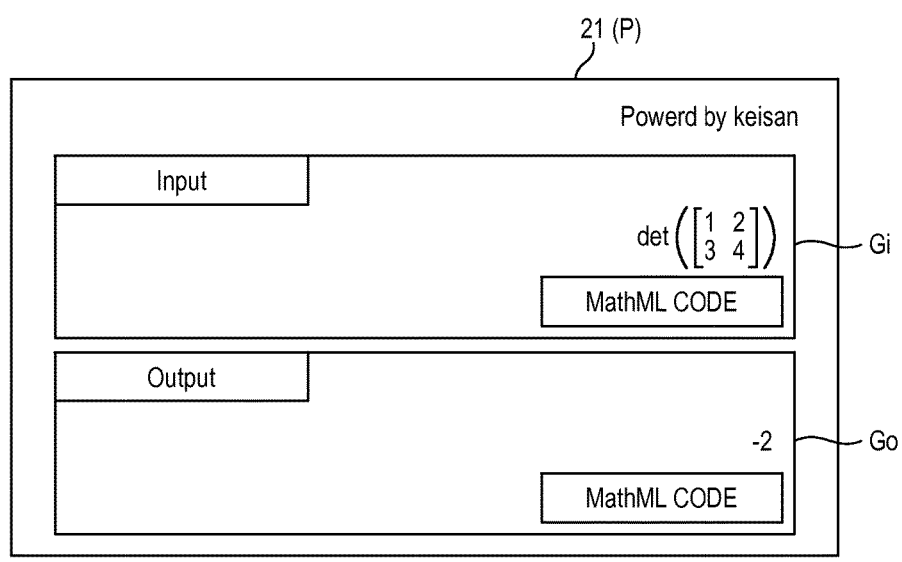

FIG. 17 is a view illustrating image data of matrix calculation reference information generated according to the server process of the compute server in response to barcode content data in the matrix mode of the scientific calculator.

DETAILED DESCRIPTION OF THE INVENTION

Hereinafter, embodiments of the present invention will be described with reference to the accompanying drawings.

First Embodiment

Figure 1B:
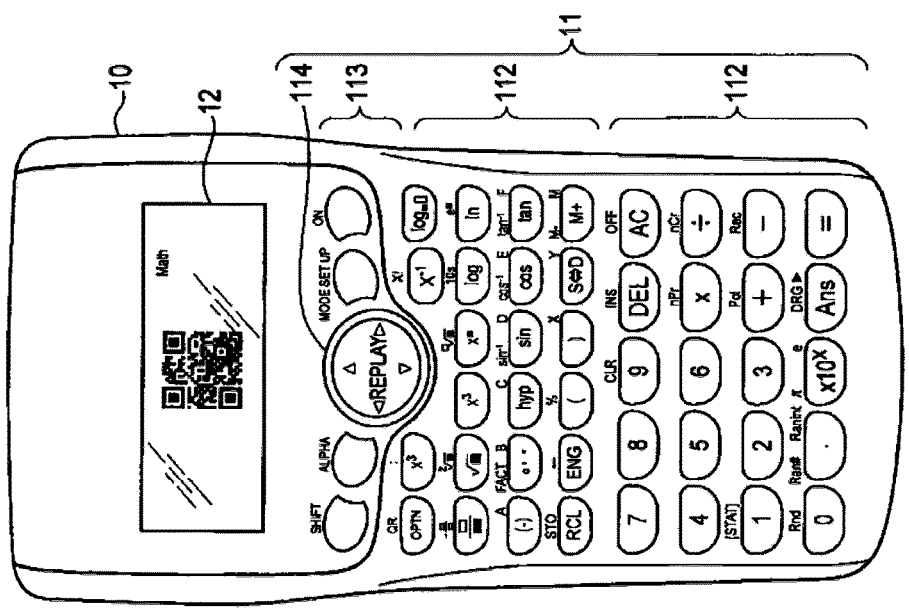
FIG. 1B is a schematic diagram illustrating the relation between the scientific calculator of the present invention and a compute server according to the first embodiment of the present invention.
Figure 1A:
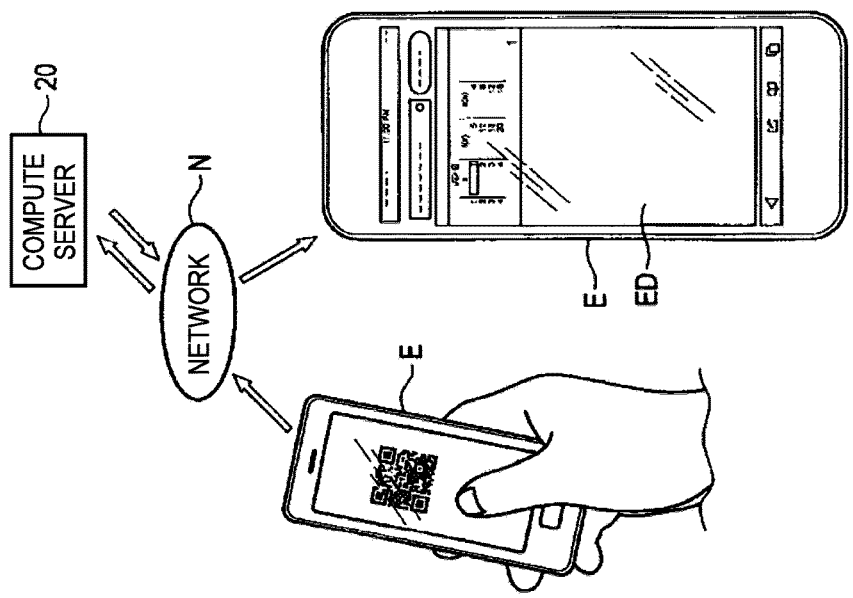
FIG. 1A is a view illustrating the configuration of the external appearance of a scientific calculator according to a first embodiment of an expression processing device of the present invention.

Now, as an example, a system which is composed of a scientific calculator 10 according to a first embodiment of an expression processing device of the present invention, a communication device E, such as a smart phone, having a camera for photographing a two-dimensional code such as a QR code displayed on the scientific calculator 10, a compute server 20 according to the first embodiment of the present invention which the corresponding communication device E with the camera can access through a communication network N such as the Internet according to the content of the photographed two-dimensional code, and a communication device E which receives the calculation result of the corresponding compute server 20 through the communication network N and displays the calculation result, as shown in FIGS. 1A and 1B will be described. Also, FIG. 1B shows two communication devices E; however, they are just for showing a display difference between transmission data and reception data related to the compute server 20, and are the same, that is, one communication device. Undoubtedly, as shown in FIG. 1B, separate communication devices can be provided. Also, the communication device E is not limited to a smart phone, and can be configured as a PDA (personal digital assistant), a tablet PC, a laptop PC (personal computer), etc.

The scientific calculator 10 is configured in a small size due to the necessity of portability such that a user can sufficiently grip it with one hand and operate it with one hand. On the front surface of the main body of the scientific calculator 10, a key input unit 11 and a display output unit 12 are provided.

The key input unit 11 includes a numerical-value/operation-symbol key group 111 for inputting numbers or expressions, or instructing calculation execution, an arithmetic-function/function key group 112 for inputting various functions or starting a memory function, a mode setting key group 113 for displaying a menu screen of various operating modes or instructing setting of an operating mode, a cursor key 114 for performing an operation to move a cursor displayed on the display output unit 12, an operation to select a data item, etc.

As the numerical-value/operation-symbol key group 111, "0" to "9" (numeric) keys, "+", "−", "×", and "÷" (four basic operation symbols) keys, "Ans" and "=" (execution) keys, "AC" (clear) key, and so on are arranged.

As the arithmetic-function/function key group 112, an "$x^{-1}$" (x to the negative one power; the reciprocal of x) key, a "$\sqrt{\square}$" (root) key, a "$\square/\square$" (fraction) key, a "sin" (sine) key, an "M+" (memory plus) key, an "OPTN" (option) key, a "RCL" (memory call) key, and so on are arranged.

As the mode setting key group 113, a "MODE" (mode) key, a "SHIFT" (shift) key, an "ALPHA" (alphabet) key, an "ON" (power-on) key, and so on are arranged.

Also, each key of the numerical-value/operation-symbol key group 111 and the arithmetic-function/function key group 112 is configured so as to be able to act as a key for a function written above the corresponding key, not a function written on the corresponding key, if the corresponding key and the "SHIFT" key are operated (pressed) at the same time. For example, a simultaneous operation on the "SHIFT" key and the "AC" key (This will be hereinafter referred to as a "SHIFT"+"AC" key. The same applies hereinafter) becomes an "OFF" (power-off) key. A "SHIFT"+"OPTN" key becomes a "QR" (QR) key, and a "SHIFT"+"RCL" key becomes a "STO" (memory registration) key The display output unit 12 is composed of a dot matrix type liquid crystal display unit.

Figure 2:
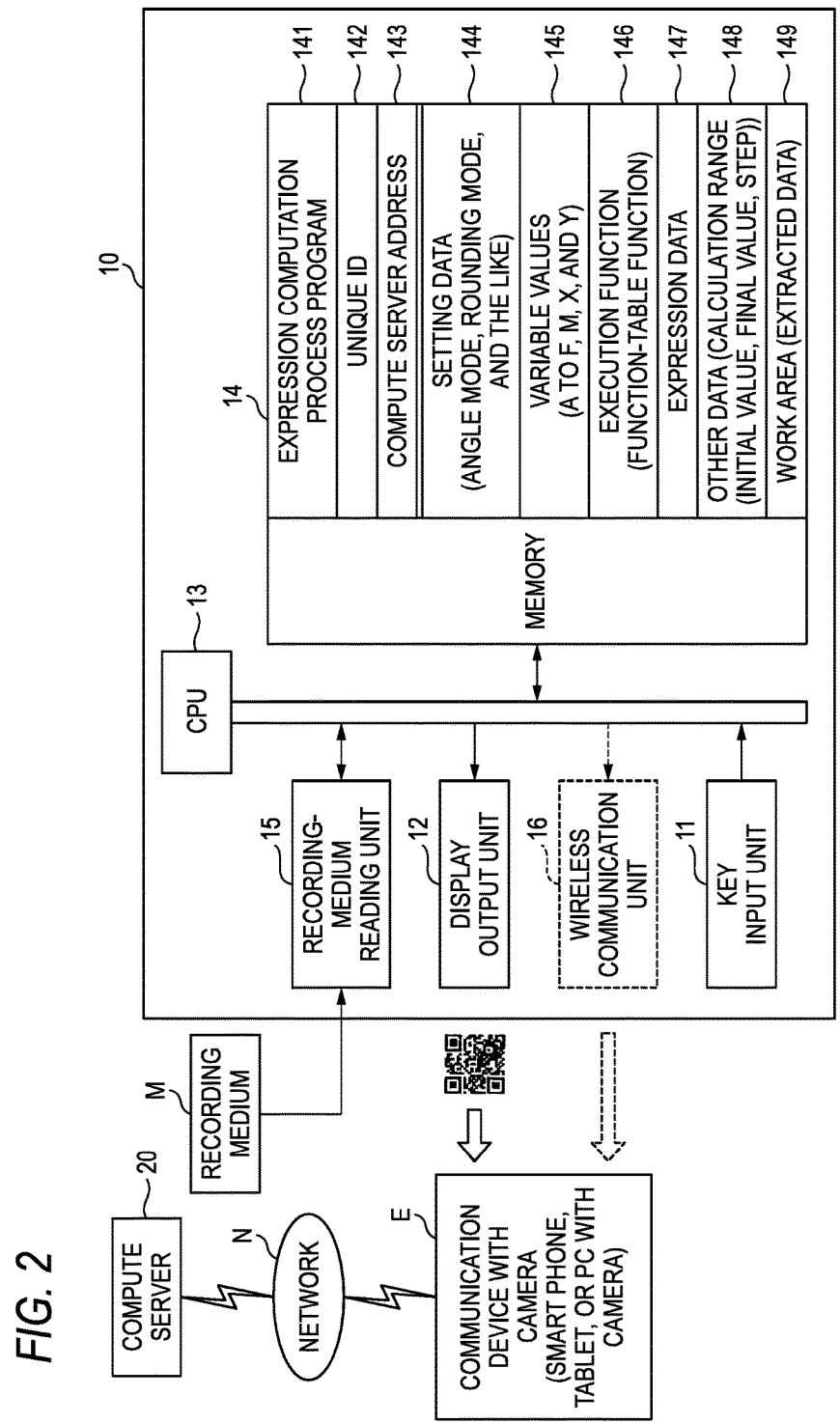
FIG. 2 is a view illustrating the circuit configuration of the scientific calculator.

FIG. 2 is a block diagram illustrating the configuration of an electronic circuit of the scientific calculator 10.

The electronic circuit of the scientific calculator 10 includes a CPU 13 which is a computer (or a processor), a memory 14, and a recording-medium reading unit 15, in addition to the key input unit 11 and the display output unit 12. Also, as shown by a broken line in FIG. 2, the electronic circuit may include a wireless communication unit 16.

The CPU 13 controls the operation of each unit of the circuit according to an expression computation process program 141 stored in the memory 14, thereby executing various calculation processes according to key input signals from the key input unit 11. The expression computation process program 141 may be stored in advance in the memory 14, or may be loaded from an external recording medium M such as a memory card into the memory 14 through the recording-medium reading unit 15. The expression computation process program 141 is configured such that a user cannot rewrite the corresponding program by operating the key input unit 11.

In the memory 14, as other information which the user cannot rewrite, a unique ID 142 is also stored. Here, the unique ID 142 is an ID unique to each scientific calculator 10.

In the memory 14, in order to store data which the user can rewrite, besides such information which the user cannot rewrite, an setting data memory 144, a variable value memory 145, an execution function memory 146, an expression data memory 147, an other-data memory 148, a work area 149, and so on are ensured.

In the setting data memory 144, setting data related to various calculation display modes which are set according to an operation on a "SHIFT"+"MODE" key of the key input unit 11 is stored. As the calculation display mode setting data, setting data of various calculation display modes such as display modes "1: LineIO (one line display) MODE" and "2: MthIO (textbook display) MODE", angle calculation modes "3: deg (degree) MODE", "4: rad (radian) MODE", and "5: gra (grade) MODE", and rounding calculation modes "6: Fix MODE (in which digits after a decimal point is fixed)", "7: Sci MODE (in which the number of significant digits is designated)", and "8: Norm MODE (in which rounding is not executed)" are stored. In the setting data memory 144, in an initial state, predetermined initial modes are set. Specifically, initial setting modes such as the display mode "MthIO (textbook display) MODE", the angle calculation mode "deg (degree) MODE", and the rounding calculation mode "Norm MODE (in which rounding is not executed)" are stored. Thereafter, for example, if the "SHIFT"+"MODE" (="SETUP") key is operated and then the "4" key is pressed, the angle calculation mode "3: deg (degree) MODE" is changed to the angle calculation mode "4: rad (radian) MODE", and the changed angle calculation mode is registered.

The variable value memory 145 is a memory area where individually different numerical values and the like are stored with respect to nine characters A, B, C, D, E, F, M, X, and Y. In an initial state, all of those numerical values are set to "0". Thereafter, for example, if the "3" key, the "SHIFT"+"RCL" key (="STO" key), and the "−" key (=an "A" key) are subsequently operated, a variable memory A of the variable value memory 145 is designated and a variable value "3" is set. Also, the variable value memory 145 may be used as a memory area where individually different numerical values and the like are stored with respect to the individual characters A to Z. In that case, whenever a variable is designated and a variable value is set according to user's operations, a memory area for the corresponding variable may be ensured.

In the execution function memory 146, a calculation mode, such as a function-table function, set according to an operation on a "MODE" key of the key input unit 11 is stored.

In the expression data memory 147, data on key codes input by keys of the key input unit 11 are subsequently input and data on an expression configured thereby is stored. For example, the numeric keys are stored as codes representing numbers, and the function keys such as the "sin" key are stored as codes representing the corresponding functions, and the operation symbol keys such as the "+", "−", "×", and "÷" keys are stored as codes representing the corresponding operation symbols.

In the other-data memory 148, the other data essential for expression calculation, for example, calculation ranges are stored. A calculation range includes an initial value, a final value, and a step.

In the work area 149, a variety of data which are input to or output from the CPU 13 according to the expression computation process program 141 is temporarily stored if necessary. For example, settings and variables essential for expression calculation and extracted in a manner to be described in detail below are stored.

Also, the wireless communication unit 16 has a function of performing wireless communication with the external communication device E or the like by Bluetooth (a trademark), infrared communication, or the like.

The CPU 13 of the scientific calculator 10 configured as described above controls the operations of the individual units of the circuit according to commands described in the expression computation process program 141 such that software and hardware operate in cooperation with each other, thereby implementing a display control function of converting the address of the compute server 20, the unique ID of the corresponding scientific calculator 10, a function type (for example, the function-table function) input from the key input unit 11, function-based calculation data (for example, a function expression and a calculation range), extraction data, and the other data (for example, setting data) into a two-dimensional code (in the present embodiment, a QR code) and displaying the two-dimensional code by the display output unit 12, as will be described in the following operation description.

The communication device E with the camera photographs the QR code displayed on the display output unit 12 of the scientific calculator 10, and transmits the content (QR data) of the photographed QR code to the compute server 20 through the communication network N according to the QR data.

Figure 3:
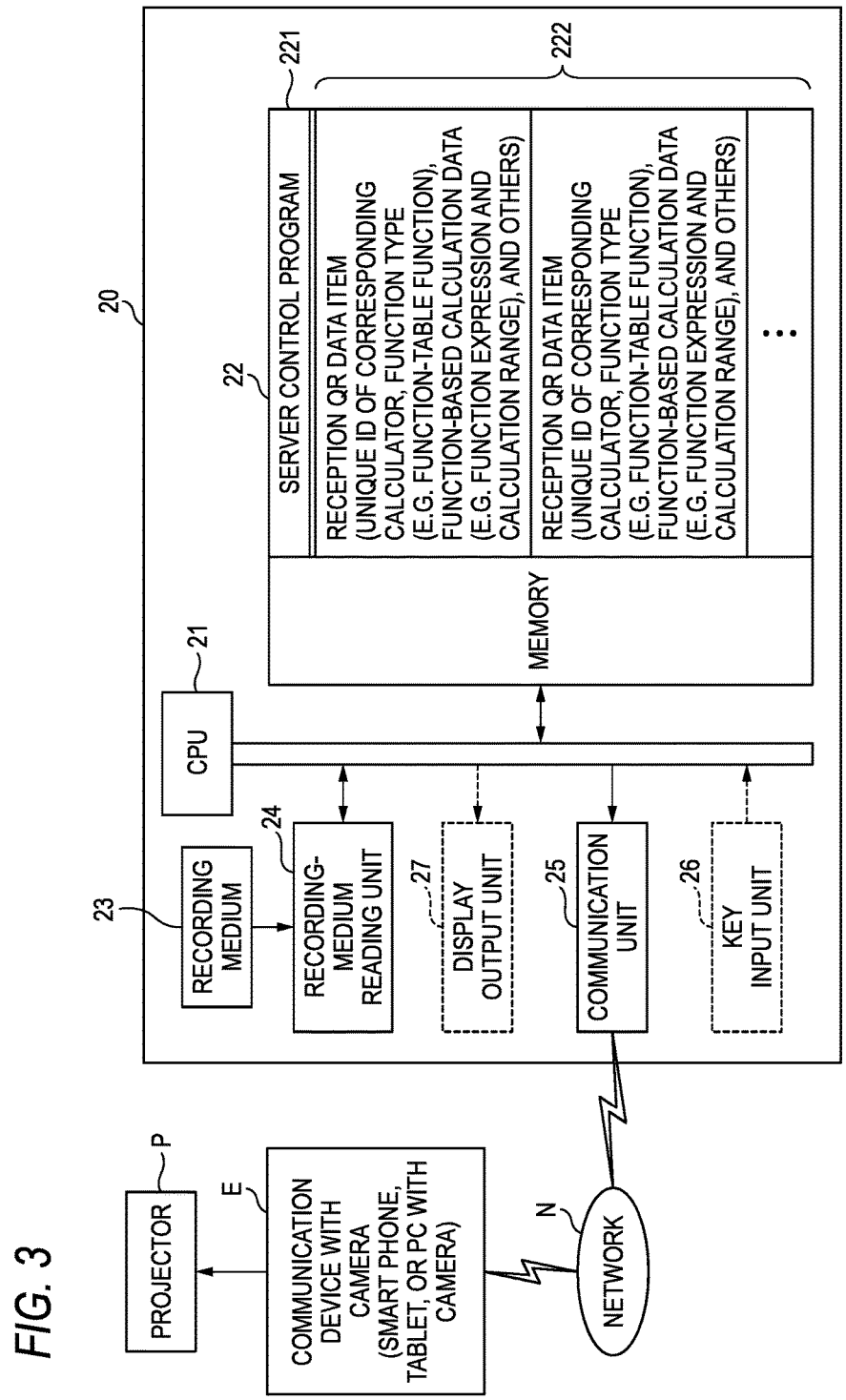
FIG. 3 is a view illustrating the circuit configuration of the compute server.

FIG. 3 is a block diagram illustrating the configuration of an electronic circuit of the compute server 20.

The electronic circuit of the compute server 20 includes a CPU 21 which is a computer, a memory 22, a recording medium 23, a recording-medium reading unit 24, and a communication unit 25. Also, as shown by broken lines in FIG. 3, the electronic circuit may include a key input unit 26 or a display output unit 27.

The CPU 21 controls the operations of the individual units of the circuit according to a server control program 221 stored in the memory 22, thereby executing various calculation processes according QR data received from the communication device E with the camera by the communication unit 25. The server control program may be stored in advance in the memory 22, or may be loaded from the recording medium 23 into the memory 22 through the recording-medium reading unit 24, or may be downloaded from a Web server on the communication network N into the memory 22 through the communication unit 25.

In the memory 22, the server control program 221 is stored, and a reception QR data memory 222 for individually storing QR data items received through the communication unit 25 are ensured.

Also, the server control program 221 has a function of performing a setting operation or a maintenance operation according to a setting operation, a maintenance operation, or the like on the key input unit 26 by an operator of the corresponding compute server 20, a function of displaying the intermediate progress or result of an operation of the server control program on the display output unit 27, and so on.

The CPU 21 of the compute server 20 configured as described above controls the operations of the individual units of the circuit according to commands described in the server control program 221 such that software and hardware operate in cooperation with each other, thereby implementing a server process function of calculating an expression based on reception QR data and transmitting the result of the calculation to the communication device E with the camera which is the transmission source of the reception QR data, as will be described in the following operation description. Also, in a case where the reception QR data includes data includes information for specifying another communication device as a calculation result transmission destination, or a transmission destination is specified in advance in association with the unique ID of the scientific calculator 10, it is possible to transmit the calculation result to a corresponding device other than the communication device E with the camera which is the transmission source.

If the communication device E with the camera receives the calculation result from the compute server 20 through the communication network N, it can display the calculation result on its display output unit ED, or can project the calculation result by connecting a projector P to the corresponding communication device E with the camera.

Subsequently, the display control function of the scientific calculator 10 having the above described configuration will be described with reference to the flow chart of a display control process of FIG. 4.

If an operation on the key input unit 11 is performed, in STEP S101, the CPU 13 of the scientific calculator 10 determines whether the corresponding operation is a setting data change operation, that is, an operation on the "SHIFT"+"MODE" (="SETUP") key. In a case of determining that the corresponding operation is not a setting data change operation, in STEP S102, the CPU 13 determines whether the operation on the key input unit 11 is a function-table function execution operation, that is, a function table selection operation based on an operation on the "MODE" key. In a case of determining that the operation on the key input unit is not a function-table function execution operation, in STEP S103, the CPU 13 determines whether the operation on the key input unit 11 is a variable input operation, that is, an operation on the "SHIFT"+"RCL" (="STO") key. In a case of determining that the operation on the key input unit is not a variable input operation, the CPU 13 performs another process.

In a case of determining in STEP S101 that the operation on the key input unit is a setting data change operation, the CPU 31 controls the display output unit 12 such that the display output unit displays a change screen for changing and setting a plurality of types of setting data relative to expression display calculation. Specifically, in STEP S104, display modes "1: MthIO (natural display)" and "2: LineIO (line display)", angle calculation modes "3: deg (angel setting: degree) MODE", "4: rad (angel setting: radian) MODE" and "5: Gra (angel setting: grade) MODE", rounding calculation modes "6: Fix MODE (in which digits after a decimal point is fixed)", "7: Sci MODE (in which the number of significant digits is designated)", and "8: Norm MODE (in which rounding is not executed)", and the like are displayed. Further, the CPU 13 changes the content of the setting data memory 144 of the memory 14 to modes set by user's operations on the key input unit 11 (number inputs using numeric keys). Specifically, if the user presses a numeric key "4", in STEP S105, the angle mode content of the setting data memory 144 of the memory 14 is changed to the radian mode and the changed mode is set.

Thereafter, the CPU 13 returns the process to STEP S101 described above.

Meanwhile, in a case of determining in STEP S103 described above that the operation on the key input unit is a variable input operation, the CPU 13 receives an input of a variable value for a variable designated by a user's input operation on the key input unit 11 in STEP S106, and sets the input variable value in the variable value memory 145 for the designated variable in the memory 14 in STEP S107. Thereafter, the CPU 13 returns the process to STEP S101 described above.

Meanwhile, in a case of determining in STEP S102 that the operation on the key input unit is a function-table function execution operation, in STEP S108, the CPU 13 stores "function-table function" in the execution function memory 146 of the memory 14 while receiving expression inputs of a first function expression and a second function expression according to user's operations on the key input unit 11. Specifically, in response to the function-table function execution operation, first, the CPU 13 displays "f(x)=" for inputting the first function expression on the display output unit 12, thereby prompting the user to input the first function expression. Then, the user inputs, for example, a function expression "(A+B) x" which is an expression including variables "A" and "B" by operating the key input unit 11, as shown in Part (A) of FIG. 5, and then operates the "=" key which is an execution key. As a result, in the expression data memory 147 of the memory 14, "f(x)=(A+B) x" is registered as the first function expression. Subsequently, the CPU 13 displays "g(x)=" for inputting the second function expression on the display output unit 12, thereby prompting the user to input the second function expression. Then, the user inputs, for example, a function expression "(A+C) x" which is an expression including variables "A" and "C" by operating the key input unit 11, as shown in Part (B) of FIG. 5, and then operates the "=" key. As a result, in the expression data memory 147 of the memory 14, "g(x)=(A+C) x" is registered as the second function expression.

Thereafter, in STEP S109, the CPU 13 determines whether the "QR" key, that is, the "SHIFT"+"OPTN" key of the key input unit 11 has been pressed. In a case of determining that the "QR" key has been pressed, the CPU 13 advances the process to STEP S113 to be described below.

In contrast with this, in a case of determining that the "QR" key has not been pressed, in STEP S110, the CPU 13 receives an input of a function expression calculation range (an initial value, a final value, and a step (an increment)) according to a user's operation on the key input unit 11. That is, the CPU 13 first displays "Start?" for inputting the initial value on the display output unit 12, thereby prompting the user to input the initial value. Then, the user inputs, for example, a numerical value "1" as the initial value as shown in Part (C) of FIG. 5 by operating the key input unit 11, and then operates the "=" key. As a result, in the other-data memory 148 of the memory 14, "1" is registered as the initial value. Subsequently, the CPU 31 displays "End?" for inputting the final value on the display output unit 12, thereby prompting the user to input the final value. Then, the user inputs, for example, a numerical value "4" as the final value as shown in Part (D) of FIG. 5 by operating the key input unit 11, and then operates the "=" key. As a result, in the other-data memory 148 of the memory 14, "4" is registered as the final value. Thereafter, the CPU 31 displays "Step?" for inputting the increment on the display output unit 12, thereby prompting the user to input the increment. Then, the user inputs, for example, a numerical value "1" as the increment as shown in Part (E) of FIG. 5 by operating the key input unit 11, and then operates the "=" key. As a result, in the other-data memory 148 of the memory 14, "1" is registered as the step.

If the function expression calculation range is input as described above, in STEP S111, the CPU 13 calculates a function table, based on the function expressions stored in the expression data memory 147 of the memory 14, the calculation range stored in the other-data memory 148, and the variables stored in the variable value memory 145, and displays the result of the calculation on the display output unit 12 according to the set modes stored in the setting data memory 144.

Thereafter, in STEP S112, the CPU 13 determines whether the "QR" key, that is, the "SHIFT"+"OPTN" key of the key input unit 11 has been pressed. In a case of determining that the "QR" key has been pressed, the CPU 13 advances the process to STEP S113 to be described below. In contrast with this, in a case of determining that the "QR" key has not been pressed, the CPU 13 returns the process to STEP S101 described above.

In a case of determining in STEP S109 or STEP S112 described above that the "QR" key has been pressed, in STEP S113, the CPU 13 performs a necessary-information detecting process.

FIG. 6A shows a flow chart of the necessary-information detecting process.

That is, in the necessary-information detecting process, first, in STEP S113A, the CPU 13 determines whether there is any variable in the input expressions stored in the expression data memory 147 of the memory 14. In a case of determining that there is no variable, in STEP S113B, the CPU 13 determines whether any trigonometric function is included in the input expressions. In a case of determining that any trigonometric function is not included, the CPU 13 returns the process to the upper routine.

In a case of determining in STEP S113A described above that there is a variable, for example, in the above described example, since there are the variables A, B, and C, in STEP S113C, the CPU 13 extracts the values for the variables of the input expressions, for example, "1", "4", and "3", from the variable value memory 145 of the memory 14, and stores the extracted data as extraction data in the work area 149 of the memory 14. Thereafter, the CPU 13 advances the process to STEP S113B as described above.

Meanwhile, in a case of determining in STEP S113B described above that a trigonometric function is included, in STEP S113D, the CPU 13 extracts a set angle mode (the deg mode, the rad mode, or the gra mode) from the setting data memory 144 of the memory 14, and stores the extracted data as extraction data in the work area 149 of the memory 14. Thereafter, the CPU 13 returns the process to the upper routine. Also, in a case where the calculation result becomes a decimal, rounding mode setting data for setting whether to round the decimal is required. In this case, the rounding mode setting data may also be stored as extraction data in the work area 149. Also, individual setting data items of the setting data memory 144 may be collectively stored as extraction data in the work area 149.

An example in which a trigonometric function is included in the function expressions is shown in FIG. 7.

In STEP S108 described above, with respect to the display of "f(x)=" for inputting the first function expression, if the "sin" key is operated as shown in Part (A) of FIG. 7, "f(x)=sin(" is displayed. Subsequently, if an "x" key (an "ALPHA"+")" key and a ")" key are operated, and then the "=" key is operated, "f(x)=sin(x)" is registered as the first function expression in the expression data memory 147 of the memory 14. Subsequently, with respect to the display of "g(x)=" for inputting the second function expression, if a "cos" key is operated as shown in Part (B) of FIG. 7, "g(x)=cos(" is displayed. Subsequently, if an "x" key (an "ALPHA"+")" key and a ")" key are operated, and then the "=" key is operated, "g(x)=cos(x)" is registered as the second function expression in the expression data memory 147 of the memory 14.

Thereafter, with respect to the display of "Start?" for inputting the initial value, if a numerical value "0" is input as the initial value and then the "=" key is operated, as shown in Part (C) of FIG. 7, "0" is registered as the initial value in the other-data memory 148 of the memory 14. Subsequently, with respect to the display of "End?" for inputting the final value, if numerical values "3", "6", and "0" are input as the final value and then the "=" key is operated, as shown in Part (D) of FIG. 7, "360" is registered as the final value in the other-data memory 148 of the memory 14. Thereafter, with respect to the display of "Step?", if numerical values "9" and "0" are input as the increment and then the "=" key is operated, as shown in Part (E) of FIG. 7, "90" is registered as the step in the other-data memory 148 of the memory 14.

In a case where inputting has been performed as described above, in STEP S113A described above, it is determined that there is no variable; however, in step 113B described above, it is determined that a trigonometric function is included. Therefore, for example, if it is assumed that the deg mode has been set in STEP S105 described above, in STEP S113D, the deg mode which is the set angle mode is extracted from the setting data memory 144 of the memory 14, and is stored as extraction data in the work area 149 of the memory 14.

If the necessary-information detecting process of STEP S113 as described above finishes, in STEP S114, the CPU 13 converts the address of the compute server 20, the unique ID of the corresponding scientific calculator 10 stored in a unique ID memory 142 of the memory 14, the function type of the execution function (for example, "function-table function") stored in execution function memory 146, the function-based calculation data (for example, the function expressions stored in the expression data memory 147 and the calculation range stored in the other-data memory 148), the extraction data stored in the work area 149 (for example, the angle mode extracted from the setting data memory 144, and the variable values extracted from the variable value memory 145), and the others, into a QR code, and displays the QR code on the display output unit 12.

As a result, as shown in Part (F) of FIG. 5 or Part (F) of FIG. 7, the QR code is displayed on the display output unit 12. Also, the content of the QR code of Part (F) of FIG. 5 is as shown in Part (G) of FIG. 5. Also, the content of the QR code of Part (F) of FIG. 7 is as shown in Part (G) of FIG. 7.

Thereafter, in STEP S115, the CPU 13 determines whether there is a function expression re-input. In a case of determining that there is no re-input, the CPU 13 returns the process to STEP S101 described above.

In contrast with this, in a case of determining that there is a re-input, the CPU 13 returns the process to STEP S108 described above. Then, the CPU 13 receives an input of a new function expression in the above described manner. In a case where changing of the calculation result is not required with respect to the new function expression, the CPU 13 determines in STEP S109 described above that the "QR" key, that is, the "SHIFT"+"OPTN" key has been pressed, and advances the process to STEP S113 described above.

Subsequently, the server process function of the compute server 20 having the above described configuration will be described a flow chart of a server process of FIG. 8A.

First, in STEP S201, the CPU 21 of the compute server 20 determines whether to perform a QR data process. In a case of determining to perform another process without performing the QR data process, the CPU 21 advances the process to another process.

In contrast with this, in a case of determining to perform the QR data process, in STEP S202, the CPU 21 waits for the communication unit 25 to receive QR data according to a QR operation of the communication device E with the camera. That is, if the scientific calculator 10 displays the QR code on the display output unit 12 by the above described display control process, and that QR code is photographed by the electronic device E with the camera, the content (QR data) of that QR code is decoded, whereby access to the address of the compute server 20 becomes possible. Thereafter, automatically or in response to a user's operation on the electronic device E with the camera, the electronic device E with the camera transmits the QR data to the compute server 20 having the above described address, through the communication network N. In STEP S202, the compute server 20 waits for reception of QR data from the electronic device E with the camera.

In a case of determining that QR data has been received, in STEP S203, the CPU 21 saves the reception QR data, that is, the unique ID of the scientific calculator 10, the function type (for example, the function-table function), the function-based calculation data (for example, the function expressions and the calculation range), the extraction data (for example, the angle mode and the variable values), and the other data, in the reception QR data memory 222 of the memory 22. Subsequently, in STEP S204, using the function expressions and the extraction data of the saved QR data, the CPU 21 performs a process according to the function type. For example, in a case of the function-table function, the CPU 21 performs a calculation with respect to the calculation range, and transmits a table which is the result of the calculation, to the electronic device E with the camera which is the transmission source, through the communication network N by the communication unit 25. Therefore, the electronic device E with the camera having photographed the QR code displayed on the display output unit 12 of the scientific calculator 10 can receive the table which is the calculation result, and display the table on its display output unit ED as shown in FIG. 6B or 6C. Also, FIG. 6B shows a result calculated from the QR data of Part (G) of FIG. 5, and FIG. 6C shows a result calculated from the QR data of Part (G) of FIG. 7.

Subsequently to the process of STEP S204 described above, in STEP S205, the CPU 21 performs an expression/detection-data matching checking process.

FIG. 9 shows a flow chart of the expression/detection-data matching checking process.

That is, in the expression/detection-data matching checking process, the CPU 21 first determines whether there is any variable in the input expressions of the reception QR data stored in the reception QR data memory 222 of the memory 22. In the following processes, the input expressions include the function expressions, the initial values, the final values, and the step values (STEP S205A). In a case of determining that there is no variable in the input expressions (the function expressions, the initial values, the final values, and the step values), in STEP S205B, the CPU 21 determines whether any trigonometric function is included in the input expressions. In a case of determining that any trigonometric function is not included, the CPU 21 returns the process to the upper routine.

In a case of determining in STEP S205A described above that there is a variable like, for example, the QR data of Part (G) of FIG. 5, in STEP S205C, the CPU 21 determines whether there is a variable whose value is "0" in the extraction data of the QR data stored in the reception QR data memory 222. In a case of determining that there is no variable whose value is"0" like the QR data of Part (G) of FIG. 5, the CPU 21 advances the process to STEP S205B described above.

In contrast to this, in a case of determining that there is a variable whose value is "0", the CPU 21 determines that the result of the process of STEP S204 described above is erroneous or the corresponding process was impossible. Therefore, for example, if the variable whose value is "0" is the variable A, in STEP S205D, the CPU 21 transmits a message such as "THERE IS A POSSIBILITY THAT ANY VARIABLE VALUE FOR THE VARIABLE A HAS NOT BEEN INPUT. DO YOU WANT TO INPUT? Yes/No" to the communication device E with the camera which is the transmission source, through the communication network N by the communication unit 25. Then, in STEP S205E, the CPU 21 determines whether "Yes" has been received from the communication device E with the camera by the communication unit 25. In a case of determining that "Yes" has not been received, that is, "No" has been received, the CPU 21 advances the process to STEP S205B described above.

In contrast with this, in a case of determining that "Yes" has been received, in STEP S205F, the CPU 21 transmits a message such as "INPUT A VARIABLE VALUE FOR VARIABLE A." to the communication device E with the camera which is the transmission source, through the communication network N by the communication unit 25. If receiving this message, the communication device E with the camera outputs this message as an alert display on the display output unit ED. Then, the user can confirm the message, and input a required variable value on the communication device E with the camera, and perform an operation for transmitting the input variable value to the compute server 20. Therefore, after the transmission of the above described message, in STEP S205G, the CPU 21 waits for a variable value to be received from the communication device E with the camera by the communication unit 25. If a variable value is received, in STEP S205H, the CPU 21 writes the received variable value in the corresponding reception QR data memory 222 of the memory 22, thereby updating the reception QR data. Thereafter, the CPU 21 advances the process to STEP S205B described above.

Meanwhile, in a case of determining in STEP S205 described above that a trigonometric function is included like, for example, the QR data of Part (G) of FIG. 7, in STEP S205I, the CPU 21 determines whether the angle mode represented by the extraction data of the reception QR data stored in the reception QR data memory 222 is the deg mode. In a case of determining that the angle mode is the deg mode, the CPU 21 determines whether the set value of the argument of the functions is a multiple of 15 (degrees). Also, the set value of the argument of the functions includes not only a set value directly input as the argument in the functions but also a set value for the argument which is calculated by the input expressions (the function expressions, the initial values, the final values, and the step values) during execution of the calculation of each step (STEP S205J). In a case of determining that the set value is a multiple of 15 (degrees), the CPU 21 returns the process to the upper routine. In contrast with this, in a case of determining that the set value of the argument is not a multiple of 15 (degrees), the CPU 21 determines that the result of the process of STEP S204 described above is erroneous or the corresponding process was impossible, and advances the process to STEP S205N to be described below.

Meanwhile, in a case of determining in STEP S205I described above that the angle mode is not the deg mode, in STEP S205K, the CPU 21 determines whether the angle mode is the radian (Rad) mode. In a case of determining that the angle mode is the radian mode, in STEP S205L, the CPU 21 determines whether the set value of the argument of the functions is a multiple of $\pi/12$ (radians). In a case of determining that the set value of the argument of the functions is a multiple of $\pi/12$ (radians), the CPU 21 returns the process to the upper routine. In contrast with this, in a case of determining that the set value of the argument is not a multiple of $\pi/12$ (radians), the CPU 21 determines that the result of the process of STEP S204 described above is erroneous or the corresponding process was impossible, and advances the process to STEP S205N to be described below.

Meanwhile, in a case of determining in STEP S205K described above that the angle mode is not the radian mode, the CPU 21 determines that the angle mode is the grade (Grad) mode, and determines whether the set value of the argument of the functions is a multiple of 50/3 (grades), in STEP S205M. In a case of determining that the set value of the argument is a multiple of 50/3 (grades), the CPU 21 returns the process to the upper routine. In contrast with this, in a case of determining that the set value of the argument is not a multiple of 50/3 (grades), the CPU 21 determines that the result of the process of STEP S204 described above is erroneous or the corresponding process was impossible, and advances the process to STEP S205N to be described below.

In STEP S205N, the CPU 21 transmits a correction screen such as "THERE IS A POSSIBILITY THAT (ANGLE MODE) SETTING IS ERRONEOUS. ○DEG ○RAD ○GRA" (the current angle mode set value is represented by a black circle, not a white circle) to the communication device E with the camera which is the transmission source, through the communication network N by the communication unit 25.

For example, in the scientific calculator 10, in a case of inputting a trigonometric function "f(x)=sin(x)" as shown in Part (A) of FIG. 10 and a trigonometric function "g(x)=cos (x)" as shown in Part (B) of FIG. 10 in a state where the radian (Rad) mode has been set as the angle mode such that a mode icon 121 has been "R", and registering an initial value "0" as shown in Part (C) of FIG. 10, a final value "270" as shown in Part (D) of FIG. 10, and a step "90" as shown in Part (E) of FIG. 10, and converting the above described data into a QR code as shown in Part (F) of FIG. 10, QR data as shown in Part (G) of FIG. 10 is stored in the reception QR data memory 222 of the memory 22 of the compute server 20. Thereafter, if the process of STEP S204 is performed according to the reception QR data, on the display output unit ED of the communication device E with the camera which is the transmission source, a table as shown in Part (A) of FIG. 11 is displayed as the calculation result.

In this case, in STEP S205K, it is determined that the angle mode is the radian (Rad) mode, and in STEP S205L, it is determined that the set value of the argument of the functions, that is, the calculation range is not a multiple of π/12 (radians). Therefore, in STEP S205N, the correction screen is transmitted to the communication device E with the camera such that an alert display AL as shown in Part (A) of FIG. 11 can be displayed on the display output unit ED of the communication device E.

If confirming this alert display AL, the user corrects the setting to a correct angle mode as shown in Part (B) of FIG. 11, on the communication device E with the camera, and performs an operation to transmit the correct set value to the compute server 20.

Therefore, after the process of STEP S205N described above is performed, in STEP S205O, the CPU 21 of the compute server 20 waits for a set value to be received from the communication device E with the camera by the communication unit 25. If a set value is received, in STEP S205P, the CPU 21 updates the angle mode of the corresponding reception QR data memory 222 of the memory 22 with the received set value. Thereafter, the CPU 21 returns the process to the upper routine.

If the expression/detection-data matching checking process of STEP S205 as described above finishes, in STEP S206, the CPU 21 determines whether the data of the reception QR data memory 222 of the memory has been updated. In a case of determining that the data has not been updated, the CPU 21 finishes the QR data process and returns the process to STEP S201 described above.

In contrast with this, in a case of determining that the data has been updated, in STEP S207, using the function expressions and the extraction data of the updated QR data, the CPU 21 performs a process according to the function type. For example, in a case of the function-table function, the CPU 21 performs a calculation again with respect to the calculation range, and re-transmits a table which is the result of the calculation, to the electronic device E with the camera which is the transmission source, through the communication network N by the communication unit 25. Therefore, the electronic device E with the camera having received the variable value or having corrected the set value can receive the table re-transmitted as the calculation result, and display the table on the display output unit ED, for example, as shown in Part (C) of FIG. 11. Thereafter, the CPU 21 finishes the QR data process, and returns the process to STEP S201 described above.

In the above description, a case where a calculation of function expressions is performed in the compute server 20 has been described as an example. However, the function of the compute server 20 can be provided in an application form which can be implemented in the communication device E with the camera, for example, a smart phone.

Therefore, according to the scientific calculator 10 having the above described configuration, variable values are stored in the variable value memory 145 with respect to a plurality of variables which can be included in expressions (which are usable in expressions), respectively, and expressions are input according to user's operations on the key input unit 11, and the CPU 13 detects variables included in the input expressions, from the variable values stored in the variable value memory 145, and outputs the input expressions and the variable values of the detected variables to the outside by the display output unit 12.

Therefore, it is possible to output the input expressions on the scientific calculator 10 by the user's operations together with the variable values essential for calculating the corresponding expressions. Therefore, it becomes possible to calculate the corresponding expressions in the communication device or the compute server.

Also, the CPU 13 sets a variable value for any one variable stored in the variable value memory 145, according to a user's operation.

Therefore, it becomes possible for the user to set variable values.

Also, the scientific calculator 10 includes the setting data memory 144 retaining a plurality of types of individual setting data items relative to expression calculation display, and the CPU 13 extracts one or more of the plurality of types of individual setting data items stored in the setting data memory 144, as setting data essential for expression calculation. Then, the CPU 13 outputs the input expressions, the variable values of the detected variables, and one of more setting data items extracted from the plurality of types of individual setting data items, by the display output unit 12.

Therefore, it is possible to output the expressions and the variables together with the setting data essential for calculating the corresponding expressions.

Further, in a case where a trigonometric function is included in the input expressions, the CPU 13 extracts angle mode setting data relative to the calculation of the trigonometric function of the corresponding expressions, as setting data essential for calculating the expressions.

Therefore, it becomes possible to calculate an expression including a trigonometric function in the communication device or the compute server.

Also, it is possible to output the input expressions and the detected setting data or variable values to the outside by converting them into a two-dimensional code and displaying the two-dimensional code.

Therefore, it is unnecessary to give a wired or wireless communication function to the scientific calculator 10, and thus it is possible to provide the scientific calculator 10 at low cost.

Also, according to the compute server 20 having the above described configuration, the compute server receives the expressions together with the variable values for the variables included in the expressions or the setting data essential for calculating the expressions, output from the scientific calculator 10 which is the expression processing device to the outside, by the communication unit 25, and the CPU 21 calculates the expressions based on the received expressions, the received variable values for the variables included in the expressions or the received setting data essential for calculating the expressions, and transmits the calculation result by the communication unit 25. Also, in a case where the received expressions do not match with the received variable values for the variables included in the expressions or the received setting data essential for calculating the expressions, the CPU 21 transmits information representing that they do not match with each other, from the communication unit 25. Therefore, in the case where the expressions do not match with the variable values for the variables included in the expressions or the setting data essential for calculating the expressions, it is possible to receive corrected variable values or setting data by the communication unit 25.

Therefore, it becomes possible to receive expressions output by user's operations on the scientific calculator 10 together with variable values for the variables included in the expressions or setting data essential for calculating the expressions, and calculate the expressions. Also, in a case where the expressions do not match with the variable values for the variables included in the expressions or the setting data essential for calculating the expressions, it is possible to receive corrected variable values or setting data.

Also, if the scientific calculator 10 converts the expressions and the variable values for the variables included in the expressions or the setting data essential for calculating the expressions, into a two-dimensional code, and the two-dimensional code is photographed with the communication device E with the camera, the communication unit 25 receives the data of the two-dimensional code from the communication device E.

Therefore, it is unnecessary to given a communication function for communication with the corresponding compute server 20 to the scientific calculator 10, and thus it is possible to provide the scientific calculator 10 at low cost.

Also, in the case where the expressions do not match with the variable values for the variables included in the expressions or the setting data essential for calculating the expressions, the CPU 21 calculates the expressions based on the received expressions and the received corrected variable values or setting data, and re-transmits the calculation result by the communication unit 25.

Therefore, it is possible to provide the corrected calculation result.

Also, outputting of the input expressions and the detected setting data or variable values to the outside is not limited to display of the display output unit 12, and may be wirelessly performed by the wireless communication unit 16 as shown by the broken line in FIG. 2. In this case, the communication device E with the camera receives the expressions and the setting data or the variable values output to the outside, by a built-in wireless communication unit (not shown), and transmits them to the compute server 20 through the communication network N.

Second Embodiment

Subsequently, a second embodiment of the present invention will be described.

As the scientific calculator 10 which is the expression processing device, there is known a scientific calculator called a graphing calculator and configured to be able to display a graph of a calculation result. The second embodiment is an example of a case where the present invention has been applied to such a graphing calculator.

The configuration of an electronic circuit of the graphing calculator is similar to that of the scientific calculator 10 of the first embodiment shown in FIG. 2.

In this graphing calculator, by inputting functions "Y1=sin(x)" and "Y2=cos(x)" as shown in Part (A) of FIG. 12 and inputting a calculation range and pressing the "QR" key, similarly to the above described first embodiment, it is possible to convert the address of the compute server 20, the unique ID of the corresponding scientific calculator 10, a function type (for example, the function-table function), function-based calculation data (the function expressions and the calculation range), extraction data (for example, an angle mode), and the others. into a QR code, and display the QR code on the display output unit 12 as shown in Part (B) of FIG. 12. The content (QR data) of the QR code becomes, for example, as shown in Part (C) of FIG. 12. Here, it is assumed that the angle mode has been set to the radian (Rad) mode. If the compute server 20 performs the calculation process of STEP S204 described above based on that QR data, the electronic device E with the camera displays a table which is the calculation result, on the display output unit ED, as shown in Part (D) of FIG. 12.

In the second embodiment, similarly to the graphing calculator, switching of the electronic device E with the camera to graph display is possible. This is implemented by adding a process as shown in FIG. 8B between the STEPS S204 and S205 described above in the server process of the compute server 20.

That is, subsequently to the process of STEP S204 described above, in STEP S208, the CPU 21 determines whether a display switching instruction has been received from the communication device E with the camera by the communication unit 25. In a case of determining that a display switching instruction has not been received, the CPU 21 advances the process to STEP S205 described above.

In contrast with this, in a case of determining that a display switching instruction has been received, in STEP S209, using the function expressions and the extraction data after display switching, the CPU 21 performs a process according to the function type. That is, in STEP S204 described above, since the calculation is performed with the steps represented by the QR data, only discrete calculation results are obtained. Therefore, it is impossible to perform graph display. For this reason, the CPU 21 performs the calculation with a smaller step again, thereby obtaining a calculation result for graph display, and generates graph data from the calculation result, and transmits the graph data to the electronic device E with the camera which is the transmission source, through the communication network N by the communication unit 25. Therefore, the electronic device E with the camera having photographed the QR code displayed on the display output unit 12 of the graphing calculator can receive the graph data which is the calculation result, and display a graph on the display output unit ED as shown in Part (E) of FIG. 12.

Thereafter, the CPU 21 advances the process to the expression/detection-data matching checking process of STEP S205 described above.

Also, in the QR data of Part (C) of FIG. 12, since the angle mode is the radian (Rad) mode, and the set value of the calculation range is not a multiple of $\pi/12$ (radians), according to a process similar to the first embodiment, in STEP S205N, a correction screen is transmitted to the communication device E with the camera, and an alert display AL as shown in Part (A) of FIG. 13 is displayed on the display output unit ED of the communication device E. If the user confirms that alert display AL, and user corrects the setting to a correct angle mode on the communication device E with the camera, as shown in Part (B) of FIG. 13, and performs an operation to transmit the corrected set value to the compute server 20, the CPU 21 updates the angle mode of the corresponding reception QR data memory 222 of the memory 22 with the received set value, in STEP S205P described above, and performs a process according to the function type, using the function expressions and extraction data of the updated QR data. That is, the CPU 21 performs a re-calculation, thereby obtaining graph data as the calculation result, and re-transmits the calculation result to the electronic device E with the camera which the transmission source, through the communication network N by the communication unit 25. Therefore, the electronic device E with the camera can receive the graph data re-transmitted as the calculation result, and display the calculation result on the display output unit ED, for example, as shown in Part (C) of FIG. 13.

Although a case where table display is first set and then display switching to graph display is performed has been described, it goes without saying that conversely, graph display can be first set and then display switching to table display can be performed.

Also, in the above described first embodiment, in the necessary-information detecting process of FIG. 6A, if there is a variable in the input expressions (the function expressions) ("Yes" in STEP S113A), the CPU 13 extracts the value for the variable included in the input expressions, and saves the extraction data in the work area in STEP S113C, and converts the input expressions together with the values which are extraction data for the variable included in the input expressions, into a QR code, and displays the QR code in STEP S114. For example, the CPU 13 detects that the variable A, the variable B, and the variable C are included in the input expressions "f(x)=(A+B) x" and "g(x)=(A+C) x", and converts the input expressions together with the values "1", "4", and "3" detected for the variables A, B, and C, into a QR code.

In the above described first embodiment, the variable A or B has one numerical value. However, even if a variable has a vector or a matrix composed of a plurality of numerical values, similarly, it is possible to implement the present invention. The following modification represents a case where the variable A is a matrix.

FIG. 14 is a flow chart illustrating a display control process (the modification) of the scientific calculator.

FIG. 15 is a flow chart illustrating a server process (a matrix mode) of the compute server 20.

FIG. 16 is a view illustrating a display operation according to a user's operation in the matrix mode according to the display control process of the scientific calculator.

FIG. 17 is a view illustrating image data of matrix calculation reference information generated according to the server process of the compute server 20 based on barcode content data in the matrix mode of the scientific calculator 10.

In the scientific calculator (an information display device) 10, if the "MODE" key of the key input unit 11 is operated as shown in Part (A) of FIG. 16, in STEP T101, a calculation function list menu MF is displayed on the display output unit 12.

In the calculation function list menu MF of the present modification, eight calculation functions ([1] FOUR-BASIC-OPERATION FUNCTION, [2] COMPLEX NUMBER CALCULATION FUNCTION, [3] N-ARY CALCULATION FUNCTION, [4] MATRIX CALCULATION FUNCTION, [5] VECTOR CALCULATION FUNCTION, [6] STATISTIC CALCULATION FUNCTION, [7] FUNCTION EXPRESSION TABLE CALCULATION FUNCTION, and [8] EQUATION CALCULATION FUNCTION) are displayed so as to be selectable.

(Matrix Calculation Process)

If the matrix calculation function of [4] is selected from the calculation function list menu MF by a user's operation in STEP T102, in STEP T103, as shown in Part (B) of FIG. 16, the operation mode of the corresponding scientific calculator 10 is set to the matrix mode, and a matrix name list menu Ma for inputting matrix element data is displayed on the display output unit 12.

In the state where the matrix name list menu Ma is displayed, even if the "QR" key (the "SHIFT"+"OPTN" key) is operated as shown in Part (C) of FIG. 16, the corresponding key operation is invalidated, and thus the display content does not change (STEPS T104 and T105).

If a matrix name (here, "1: MatA") desired by the user is designated in the matrix name list menu Ma in STEP T106 as shown in Part (D) of FIG. 16, in STEP T107, a matrix size selection menu Mb is displayed on the display output unit 12.

In the state where the matrix size selection menu Mb is displayed, even if the "QR" key is operated as shown in Part (E) of FIG. 16, the corresponding key operation is invalidated, and thus the display content does not change (STEPS T108 and T109).

If a desired matrix size (here "5: 2×2") is designated in the matrix size selection menu Mb with respect to the matrix name "MatA" in STEP T110 as shown in Part (F) of FIG. 16, in STEP T111, an element data input screen Ga corresponding to the designated matrix size is displayed.

In the state where the element data input screen Ga is displayed, even if the "QR" key is operated as shown in Part (G) and Part (I) of FIG. 16, the corresponding key operation is invalidated, and thus the display content does not change (STEPS T112 and T113).

After element data "1", "2", "3", and "4" of the matrix name "MatA" are input in the element data input screen Ga as shown in Part (H) of FIG. 16, if a clear process is performed by the "AC" key, and a "MATRIX" ("SHIFT"+"4") key is operated, as shown in Part (J) of FIG. 16, in STEP T114, an expression input screen Gb is displayed.

If a matrix calculation expression (here, "det(MatA)") is input according to the expression input screen Gb, and a display is performed on the display output unit 12 as shown in Part (K) of FIG. 16, in STEP T115, the input matrix calculation expression "det(MatA)" and the element data "1", "2", "3", and "4" of the calculation target "MatA" are stored in an input data area of the memory 14.

In course of inputting of the matrix calculation expression, even if the "QR" key is operated, the corresponding key operation is invalidated, and thus the display content does not change (STEPS T116 and T117).

Thereafter, if calculation execution is instructed by an operation on the "=" key as shown in Part (L) of FIG. 16, in STEP T118, a calculation according to the matrix calculation expression "det(MatA)" (MatA=1, 2, 3, 4) is performed, and a calculation result screen GA representing the corresponding calculation expression and the calculation result "−2" is displayed on the display output unit 12.

Thereafter, if the "QR" ("SHIFT"+"OPTN") key of the key input unit 11 is operated in STEP T119 as shown in Part (M) of FIG. 16 in order to obtain calculation reference information on the calculation expression "det(MatA)" and the calculation result "−2" from the compute server 20, in STEP T120, the type of the calculation function which is being executed (the matrix calculation function), function-based calculation data (the matrix calculation expression "det(MatA)" and the element data (MatA=1, 2, 3, 4) of the calculation target matrix), and the calculation result data "−2" are converted as barcode content data into a two-dimensional code image (a QR code) Q, and the corresponding image is displayed on the display output unit 12.

Therefore, in a case where element data are re-input, the process returns from STEP T121 to STEP T111; whereas re-inputting is not performed, the process returns to STEP T103.

As described above, if the image Q of a the-dimensional code image (QR code) displayed on the display output unit 12 according to the calculation process by the matrix calculation function of the scientific calculator 10 is photographed with a communication device E with the camera (such as a tablet PC) of a student or a teacher as shown in Part (M) of FIG. 16, the barcode content data (QR data) which is the content of the two-dimensional code image (QR code) is decoded, and the type of the calculation function which is being executed (the matrix calculation function), function-based calculation data (the matrix calculation expression "det(MatA)" and the element data (MatA=1, 2, 3, 4) of the calculation target matrix, and the calculation result data "−2" which are the barcode content data (QR data) are transmitted from the corresponding communication device E to the compute server 20 through the communication network N, automatically or in response to a user's operation (see FIG. 2). Also, the address for accessing to the compute server 20 is known in advance, and is input by operating the communication device E with the camera of the user. Alternatively, in a case where the two-dimensional code image (QR code) includes that address, it is possible to extract that address from the barcode content data (QR data).

In the compute server 20, if the type of the calculation function which is being executed (the matrix calculation function), function-based calculation data (the matrix calculation expression "det(MatA)" and the element data (MatA=1, 2, 3, 4) of the calculation target matrix, and the calculation result data "−2" which are the barcode content data (QR data) transmitted from the communication device E with the camera through the communication network N are received by the communication unit 25, the CPU 21 determines that barcode content data (QR data) attributable to a QR operation has been received ("Yes" in STEP T301).

Then, in STEP T302, the received barcode content data (QR data), that is, the type of the calculation function which is being executed (the matrix calculation function), function-based calculation data (the matrix calculation expression "det(MatA)" and the element data (MatA=1, 2, 3, 4) of the calculation target matrix, and the calculation result data "−2" are primarily saved in the reception QR data memory 222 of the memory 22.

Then, if it is determined that the barcode content data (QR data) saved in the reception QR data memory 222 is data of the matrix calculation function ("Yes" in STEP T303), in STEP T304, an image of a calculation expression det([1, 2, 3, 4]) obtained by replacing the matrix part (MatA) of the matrix calculation expression "det(MatA)" with the element data "1", "2", "3", and "4" is generated as an Input screen Gi as shown in FIG. 17.

Subsequently, in STEP T305, an image of the calculation result data "−2" is generated as an Output screen Go.

Then, in STEP T306, image data which is matrix calculation reference information generated by vertically disposing the generated Input screen Gi and the generated Output screen Go is transmitted to the mail address of the communication device E with the camera of the student or the teacher which is the transmission source of the received barcode content data (QR data).

Therefore, on the display output unit 12 of a tablet PC with a camera which is the communication device E with the camera of the student or the teacher, the image data Gi/Go of the matrix calculation expression (after replacement with the element data) having been calculated in the scientific calculator 10 of the teacher and the calculation result are displayed as the matrix calculation reference information as shown in FIG. 17. Thereafter, if the corresponding matrix calculation reference information Gi/Go is magnified and projected by the projector P, everyone of the class of the corresponding student or teacher can learn while confirming the content of the corresponding calculation.

Also, the matrix calculation function in the matrix mode of the scientific calculator 10 is performed in the same manner as that of the vector calculation function according to a vector mode, and thus a detailed description of the corresponding vector calculation function is omitted.

Also, similarly in the first embodiment, in the above description, a case where a function expression calculation is performed in the compute server 20 has been described as an example. However, the function of the compute server 20 may be provided in an application form which can be implemented in the communication device E with the camera, for example, a smart phone.

Also, the method of each process of the scientific calculator 10 and the graphing calculator described in each embodiment described above, that is, the method of each of various processes such as the display control process shown in the flow chart of FIG. 4 and the necessary-information detecting process shown in the flow chart of FIG. 6A can be stored, as a program which can be executable in any computer, in the external recording medium M such as a memory card (such as a ROM card or a RAM card), a magnetic disk (such as a floppy (a trademark) disk or a hard disk), an optical disk (such as a CD-ROM or a DVD), or a semiconductor memory to be distributed.

Also, the method of each process of the compute server 20 described in each embodiment described above, that is, the method of each of various processes such as the server process shown in the flow chart of FIG. 8A, the server process shown in the flow chart of FIG. 8B, and the expression/detection-data matching checking process shown in the flow chart of FIG. 9 can be stored, as a program which can be executable in any computer, in the recording medium 23 such as a memory card (such as a ROM card or a RAM card), a magnetic disk (such as a floppy disk or a hard disk), an optical disk (such as a CD-ROM or a DVD), or a semiconductor memory to be distributed. In addition, program data for realizing the methods may be transmitted on a network N in a program code form, and the program data is loaded into a computer which is an electronic apparatus c connected to the network N by the communication unit 25, thereby realizing the above described server function.

The present invention is not limited to the embodiments, and may have various modifications within the scope without departing from the spirit thereof at the time of carrying out the invention. In addition, the embodiments include inventions of various stages, and thus various inventions may be extracted by appropriate combinations of a plurality of disclosed constituent elements. For example, even if some constituent elements are deleted from all the constituent elements shown in the embodiments, or some constituent elements are combined in different forms, a configuration in which the constituent elements are deleted or combined may be extracted as an invention in a case of being capable of solving the problems described in the Problem that the Invention is to Solve and achieving the effects described in the Advantage of the Invention.

What is claimed is:

1. An expression processing device comprising:
    an input unit;
    a display; and
    a processor,
    wherein the processor is configured to perform processes comprising:
        inputting an expression in response to a user's operation on the input unit;
        detecting a plurality of variables included in the input expression, among a plurality of variables which are usable in expressions;
        extracting one or more of a plurality of types of setting data, as setting data essential for calculating the expression, from a memory which stores the plurality of types of setting data relative to expression calculation display; and
        outputting one or more data items of: the input expression, variable values associated with the detected variables, and the extracted one or more of the plurality of types of setting data, as information for an image generating apparatus outside of the expression processing device to generate an image for external display based on the one or more data items.

2. The expression processing device according to claim 1, further comprising:
    the memory,
    wherein the variable values are stored in the memory in association with the plurality of variables which are usable in expressions respectively, and
    wherein the data items output by the processor include the input expression and the variable values associated with the detected variables stored in the memory.

3. The expression processing device according to claim 1, wherein the processor is configured to further perform a process comprising:
    in response to a user's operation, setting a variable value in association with any one of stored variables.

4. The expression processing device according to claim 2, wherein:
    the variables are matrix variables or vector variables, and in association with each of the matrix variables or the vector variables, the variable values as elements of the corresponding matrix variables or the corresponding vector variables are stored in the memory.

5. The expression processing device according to claim 1, wherein the processor is configured to further perform a process comprising:
    when a trigonometric function is included in the input expression, extracting angle mode setting data relative to a calculation of the trigonometric function of the input expression, when extracting the one or more of the plurality of types of setting data as the setting data essential for calculating the expression.

6. The expression processing device according to claim 1, wherein the outputting performed by the processor comprises:
    converting data including the input expression, the variable values of the detected variables, and the extracted one or more of the plurality of types of setting data, into a two-dimensional code; and
    displaying the two-dimensional code on the display.

7. An expression processing device comprising:
    an input unit;
    a display; and
    a processor,
    wherein the processor is configured to perform processes comprising:
        storing variable values in association with a plurality of variables respectively, the plurality of variables being usable in expressions;
        inputting an expression in response to a user's operation on the input unit;
        extracting one or more of a plurality of types of setting data, as setting data essential for calculating the expression, from a memory which stores the plurality of types of setting data relative to expression calculation display; and
        outputting one or more data items of: the input expression, variable values associated with variables included in the input expression, and the extracted one or more of the plurality of types of setting data, as information for an image generating apparatus outside of the expression processing device to generate an image for external display based on the one or more data items.

8. A non-transitory recording medium having a program stored thereon for controlling a computer of an electronic device including an input unit and a display, the program causing the computer to perform processes comprising:
    inputting an expression in response to a user's operation on the input unit;
    detecting a plurality of variables included in the input expression, among a plurality of variables which are usable in expressions;
    extracting one or more of a plurality of types of setting data, as setting data essential for calculating the expression, from a memory which stores the plurality of types of setting data relative to expression calculation display; and
    outputting one or more data items of: the input expression, variable values associated with the detected variables, and the extracted one or more of the plurality of types of setting data, as information for an image generating apparatus outside of the expression processing device to generate an image for external display based on the one or more data items.

9. A method for an electronic device including an input unit and a display, the method comprising:

inputting an expression in response to a user's operation on the input unit;

detecting a plurality of variables included in the input expression, among a plurality of variables which are usable in expressions;

extracting one or more of a plurality of types of setting data, as setting data essential for calculating the expression, from a memory which stores the plurality of types of setting data relative to expression calculation display; and outputting one or more data items of: the input expression, variable values associated with the detected variables, and the extracted one or more of the plurality of types of setting data, as information for an image generating apparatus outside of the expression processing device to generate an image for external display based on the one or more data items.

* * * * *